(12) United States Patent
Agnew

(10) Patent No.: US 11,215,113 B2
(45) Date of Patent: Jan. 4, 2022

(54) MAGNETICALLY-ACTUATED VARIABLE-LENGTH CONNECTING ROD DEVICES AND METHODS FOR CONTROLLING THE SAME

(71) Applicants: Hyundai Motor Company, Seoul (KR); Kia Motors Corporation, Seoul (KR)

(72) Inventor: Scott Agnew, Ann Arbor, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 167 days.

(21) Appl. No.: 16/514,657

(22) Filed: Jul. 17, 2019

(65) Prior Publication Data

US 2021/0017904 A1    Jan. 21, 2021

(51) Int. Cl.
*F02B 75/04*    (2006.01)
*F16C 7/06*    (2006.01)

(52) U.S. Cl.
CPC ............. *F02B 75/045* (2013.01); *F16C 7/06* (2013.01)

(58) Field of Classification Search
CPC ........ F16C 7/06; F16C 7/023; F16C 2360/22; F02B 75/045; F02D 15/02
See application file for complete search history.

(56) References Cited

U.S. PATENT DOCUMENTS

| | | | |
|---|---|---|---|
| 3,303,831 A | 2/1967 | Sherman | |
| 4,469,055 A * | 9/1984 | Caswell | F02B 75/044 123/48 B |
| 5,245,962 A * | 9/1993 | Routery | F02B 41/04 123/197.3 |
| 5,724,863 A | 3/1998 | Kramer et al. | |
| 9,334,797 B2 * | 5/2016 | Velazquez | F02B 75/045 |
| 2008/0053763 A1 | 3/2008 | Wereley et al. | |
| 2008/0197721 A1 | 8/2008 | Reyes | |
| 2009/0107454 A1 | 4/2009 | Hiyoshi et al. | |
| 2010/0006069 A1 * | 1/2010 | Yoshikawa | F02B 75/048 123/48 B |
| 2010/0132671 A1 | 6/2010 | Cho et al. | |
| 2011/0030650 A1 | 2/2011 | Wilkins | |

(Continued)

FOREIGN PATENT DOCUMENTS

DE    102007040699 A1 *  3/2009    ............ F02B 75/042

*Primary Examiner* — Joseph J Dallo
*Assistant Examiner* — Kurt Philip Liethen
(74) *Attorney, Agent, or Firm* — Mintz Levin Cohn Ferris Glovsky and Popeo, P.C.; Peter F. Corless

(57) ABSTRACT

An apparatus can include: a piston head configured to be disposed inside of a cylinder of an engine; a connecting rod device coupled to the piston head and extending therefrom, the connecting rod device including: a variable-length connecting rod including a female component with a hollow body and a male component movably disposed at least partially inside of the female component, the male component configured to be coupled to a crankshaft of the engine, and a connecting rod magnet movably coupled to the female component; and a piston coupling mechanism disposed at least partially inside of the piston head to couple the connecting rod device to the piston head. The connecting rod device can be configured to transition between a coupled state and a de-coupled state.

13 Claims, 20 Drawing Sheets

(56) References Cited

U.S. PATENT DOCUMENTS

| | | | |
|---|---|---|---|
| 2015/0152794 A1* | 6/2015 | Paul | F02D 15/02 |
| | | | 123/48 R |
| 2015/0204236 A1* | 7/2015 | Paul | F02B 75/044 |
| | | | 123/48 B |
| 2016/0333780 A1* | 11/2016 | Kamo | F02B 75/045 |
| 2017/0009647 A1 | 1/2017 | Koci | |
| 2017/0292444 A1* | 10/2017 | Kondo | F02D 15/02 |
| 2018/0238228 A1* | 8/2018 | Salzgeber | F02B 75/045 |
| 2018/0371988 A1* | 12/2018 | Melde-Tuczai | F16C 7/06 |

* cited by examiner

MAGNETICALLY-ACTUATED VARIABLE-LENGTH CONNECTING ROD DEVICES AND METHODS FOR CONTROLLING THE SAME

TECHNICAL FIELD

The present disclosure relates generally to connecting rod devices, and more particularly, to magnetically-actuated variable-length connecting rod devices and methods for controlling the same.

BACKGROUND

A connecting rod is generally known as a rigid member that provides the mechanical linkage between a piston of an engine, particularly a reciprocating engine such as an internal combustion engine, and a crank or crankshaft. The connecting rod functions as a lever arm by pushing and pulling the piston into and out of the cylinder, and converts the linear up-and-down movement of the piston into rotation of the crankshaft. This motion is then passed on to a series of devices capable of providing power to the machine, e.g., vehicle, in which the engine is equipped.

A common measure of engine power, which is dependent upon the connecting rod, is compression ratio, defined as the ratio between the swept volume of a cylinder with the piston at bottom dead center (BDC) and the swept volume of the cylinder with the piston at top dead center (TDC). Put more simply, compression ratio can refer to the ratio of maximum volume to minimum volume in the cylinder. When the connecting rod has a fixed length, the engine will have a fixed displacement and compression ratio, as the maximum and minimum volume in the cylinder are constant.

A fixed compression ratio, problematically, can result in missed performance optimization. For instance, under low engine loads, such as idling, a higher compression ratio can yield improved fuel economy. Meanwhile, under high engine loads, such as a large power request from the driver, a lower compression ratio, combined with increased boost, can yield improved power.

SUMMARY

The present disclosure provides a variable-length connecting rod device capable of dynamically changing engine displacement and compression ratio to improve overall vehicle efficiency by matching compression ratios to appropriate engine load conditions. The variable-length connecting rod device, as described herein, can vary the length of the connecting rod during operation of the engine to increase or decrease the engine's compression ratio in response to high or low engine loads, thereby optimizing engine performance. Furthermore, the variable-length connecting rod device, as described herein, can adjust the length of the connecting rod using magnetic forces, thereby eliminating unnecessary auxiliary components, such as motors, simplifying the connecting rod design, and reducing overall packaging size.

According to embodiments of the present disclosure, an apparatus can include: a piston head configured to be disposed inside of a cylinder of an engine; a connecting rod device coupled to the piston head and extending therefrom, the connecting rod device including: a variable-length connecting rod including a female component with a hollow body and a male component movably disposed at least partially inside of the female component, the male component configured to be coupled to a crankshaft of the engine, and a connecting rod magnet movably coupled to the female component; and a piston coupling mechanism disposed at least partially inside of the piston head to couple the connecting rod device to the piston head, wherein the connecting rod device is configured to transition between a coupled state, in which the male component is held in unison with the female component, and a de-coupled state, in which the connecting rod magnet moves in response to a magnetic field proximate to the cylinder causing a release of the male component, allowing the male component to move independent of the female component along an axis of the connecting rod.

Furthermore, according to embodiments of the present disclosure, an apparatus can include: a piston head configured to be disposed inside of a cylinder of an engine; a connecting rod device coupled to the piston head and extending therefrom, the connecting rod device including: a variable-length connecting rod including a female component with a hollow body and a male component movably disposed at least partially inside of the female component, the male component configured to be coupled to a crankshaft of the engine; and a piston coupling mechanism disposed at least partially inside of the piston head to couple the connecting rod device to the piston head, the piston coupling mechanism including: first and second piston-cylinder coupling pads movably disposed at opposite axial ends of the piston coupling mechanism, respectively, and a piston coupling mechanism magnet movably disposed at least partially between the first and second piston-cylinder coupling pads, wherein the piston coupling mechanism is configured to transition between a retracted state, in which the first and second piston-cylinder coupling pads are positioned inside of an outer wall of the piston head, and an extended state, in which the piston coupling mechanism magnet moves in response to a magnetic field proximate to the cylinder causing the first and second piston-cylinder coupling pads to move along an axis of the piston coupling mechanism outside of the outer wall of the piston head, such that the first and second piston-cylinder coupling pads abut an inner surface of the cylinder to hold the piston head in place inside of the cylinder.

Furthermore, according to embodiments of the present disclosure, an apparatus can include: a piston head configured to be disposed inside of a cylinder of an engine; a connecting rod device coupled to the piston head and extending therefrom, the connecting rod device including: a variable-length connecting rod including a female component with a hollow body and a male component movably disposed at least partially inside of the female component, the male component configured to be coupled to a crankshaft of the engine, and a connecting rod magnet movably coupled to the female component; and a piston coupling mechanism disposed at least partially inside of the piston head to couple the connecting rod device to the piston head, the piston coupling mechanism including: first and second piston-cylinder coupling pads movably disposed at opposite axial ends of the piston coupling mechanism, respectively, and a piston coupling mechanism magnet movably disposed at least partially between the first and second piston-cylinder coupling pads, wherein the connecting rod device is configured to transition between a coupled state, in which the male component is held in unison with the female component, and a de-coupled state, in which the connecting rod magnet moves in response to a magnetic field proximate to the cylinder causing a release of the male component, allowing the male component to move independent of the female component along an axis of the connecting rod, and wherein the piston coupling mechanism is configured to transition between a retracted state, in which the first and second piston-cylinder coupling pads are positioned inside of an outer wall of the piston head, and an extended state, in which the piston coupling mechanism magnet moves in response to the magnetic field causing the first and second piston-cylinder coupling pads to move along an axis of the piston coupling mechanism outside of the outer wall of the piston head, such that the first and second piston-cylinder coupling pads abut an inner surface of the cylinder to hold the piston head in place inside of the cylinder.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1A:
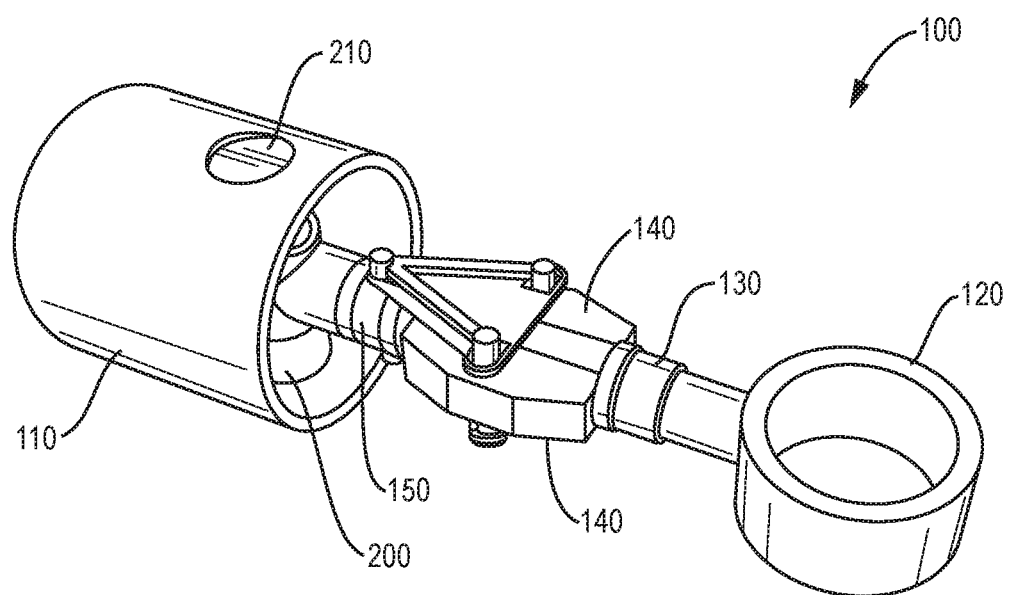
FIGS. 1A and 1B are views of an exemplary magnetically-actuated piston and connecting rod device with a variable-length connecting rod.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit, or electronic control unit (ECU). The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed variable-length connecting rod device is capable of dynamically changing engine displacement and compression ratio. The connecting rod device includes one or more magnets which can be actuated in the presence of a magnetic field to lengthen or shorten the connecting rod. The magnetic field can be activated at specific times during operation of the engine to adjust the length of the connecting rod such that the resultant compression ratios are matched to appropriate engine load conditions, thus improving overall engine load conditions and performance.

Figure 1B:
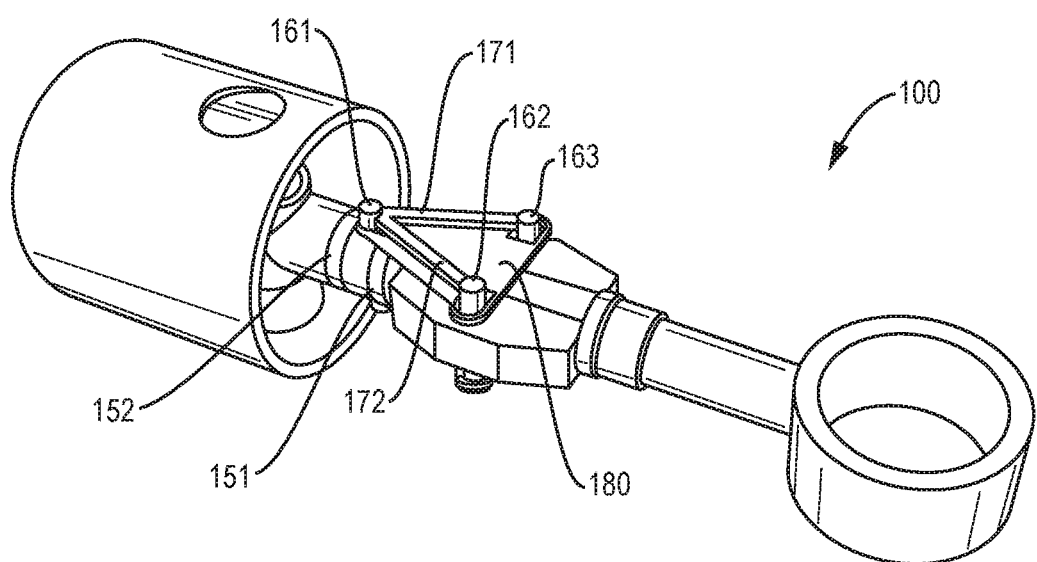

FIGS. 1A and 1B are views of an exemplary magnetically-actuated piston and connecting rod device with a variable-length connecting rod. As shown in FIGS. 1A and 1B, the magnetically-actuated piston and connecting rod device 100 can include a piston head 110 coupled to a connecting rod device extending therefrom. The piston head 110 can be cylindrically shaped in some embodiments, but the shape of the piston head 110 is not limited thereto. The piston head 110 can be disposed inside of a cylinder 400 of an engine (not shown), particularly a reciprocating engine such as an internal combustion engine, and can travel vertically (depending on orientation) inside of the cylinder 400. While only a single magnetically-actuated piston and connecting rod device 100 is shown in FIGS. 1A and 1B and throughout the remaining figures, a magnetically-actuated piston and connecting rod device 100, as described in detail herein, can be disposed in each cylinder 400 of the engine.

The magnetically-actuated piston and connecting rod device 100 can further include a connecting rod device coupled to the piston head 110 and extending therefrom, as mentioned above. The connecting rod device can include a variable-length connecting rod with a male component 120 and a female component 130. The female component 130 can be formed with an at least partially hollow body. The male component 120 can be formed such that at least a portion thereof can be movably inserted into the hollow body of the female component 130.

A distal end of the male component 120 (closest to the piston head 110) can be inserted into the female component 130, and a proximal end of the male component 120 (furthest from the piston head 110) can be formed with a circular opening configured to receive a crankshaft (not shown) of the engine 400. Meanwhile, a proximal end of the female component 130 can include an opening configured to receive the distal end of the male component 120, and a distal end of the female component can be coupled to the piston head 110 via the piston coupling mechanism 200.

Each of the male component 120 and female component 130 can be cylindrically shaped in some embodiments, but the respective shapes of the male component 120 and female component 130 are not limited thereto. Under certain circumstances described in greater detail below, the male component 120 can move in and out of the female component 130 along the axis (longitudinal axis) of the connecting rod, thereby varying the length of the connecting rod. The female component 130, meanwhile, can remain positionally fixed with respect to the connecting rod device by virtue of its connection to the piston head 110.

The connecting rod device can further include first and second male-female coupling pads 140 disposed on opposite sides of the female component 130. Under certain circumstances described in greater detail below, the first and second male-female coupling pads 140 can move perpendicular to the axis of the connecting rod. The respective inner walls of the first and second male-female coupling pads 140 can be cylindrically shaped so as to conform to the shape of the male component 120. Thus, the first and second male-female coupling pads 140 can hold the male component 120 in unison with the female component 130 by applying opposing forces on the male component 120 in a direction perpendicular to the axis of the connecting rod. That is, the first and second male-female coupling pads 140 can push against each other with the male component 120 therebetween to hold the male component 120 in place inside of the female component 130.

Figure 2:
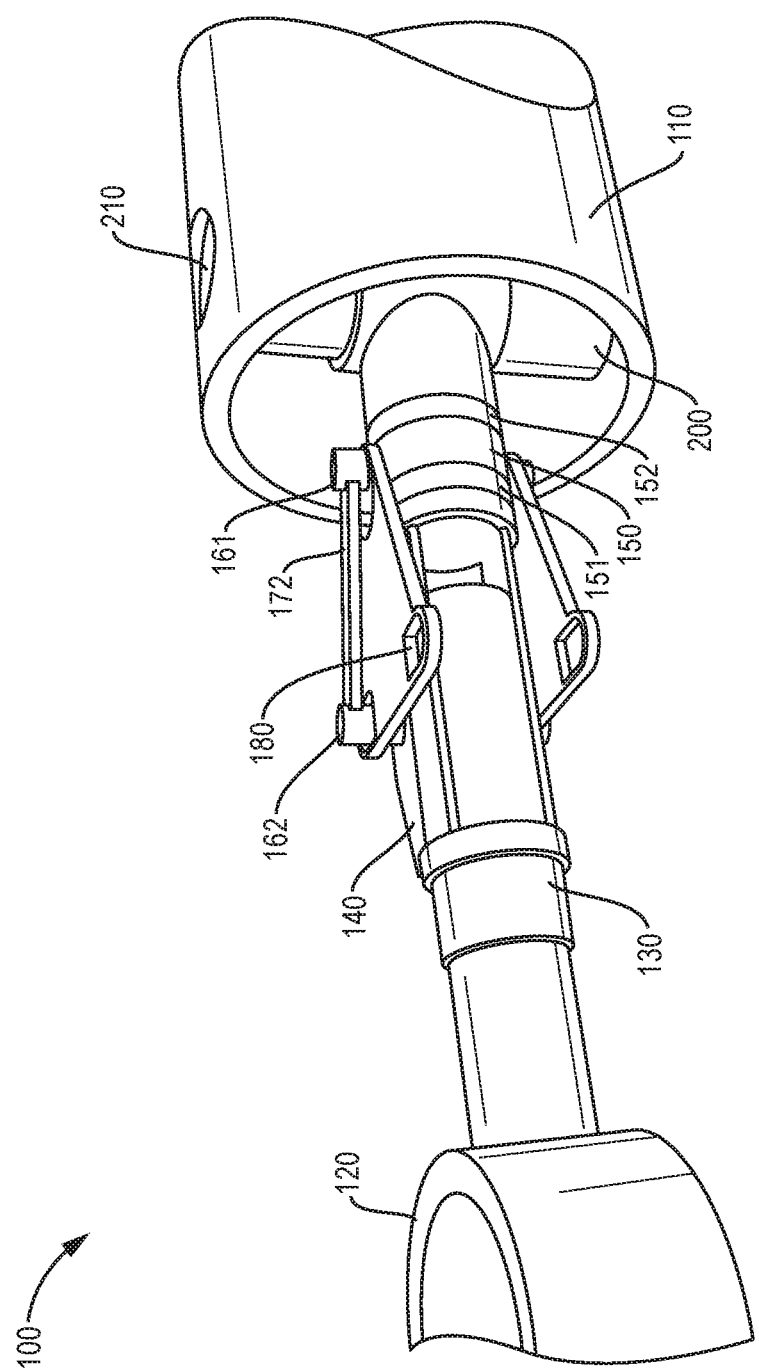
FIG. 2 is a select-component view of the magnetically-actuated piston and connecting rod device of FIGS. 1A and 1B.
Figure 3A:
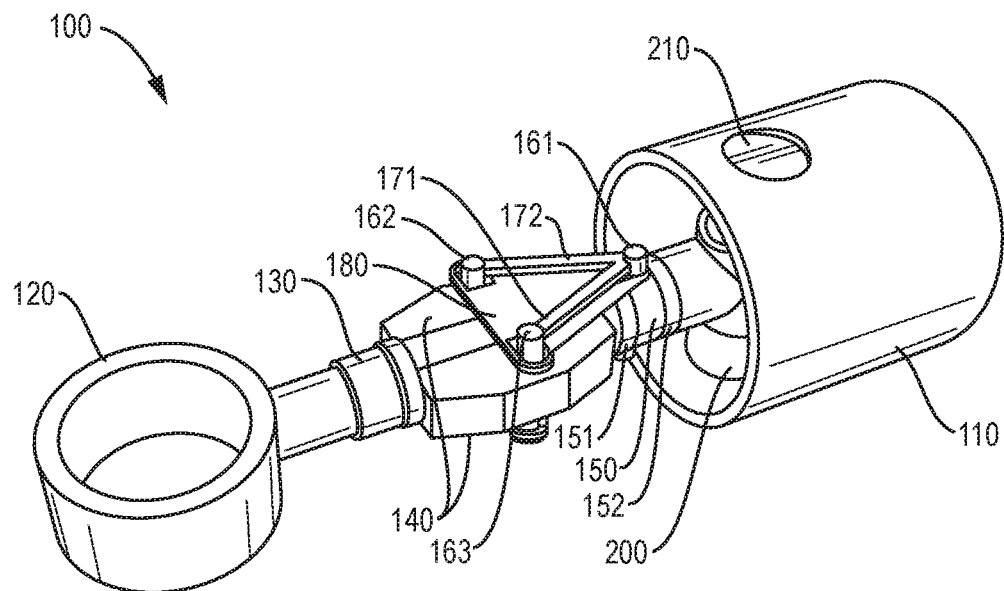
FIGS. 3A-3D are views of the magnetically-actuated piston and connecting rod device of FIGS. 1A and 1B when no current is applied to a solenoid wrapped around a cylinder of an engine.
Figure 3B:
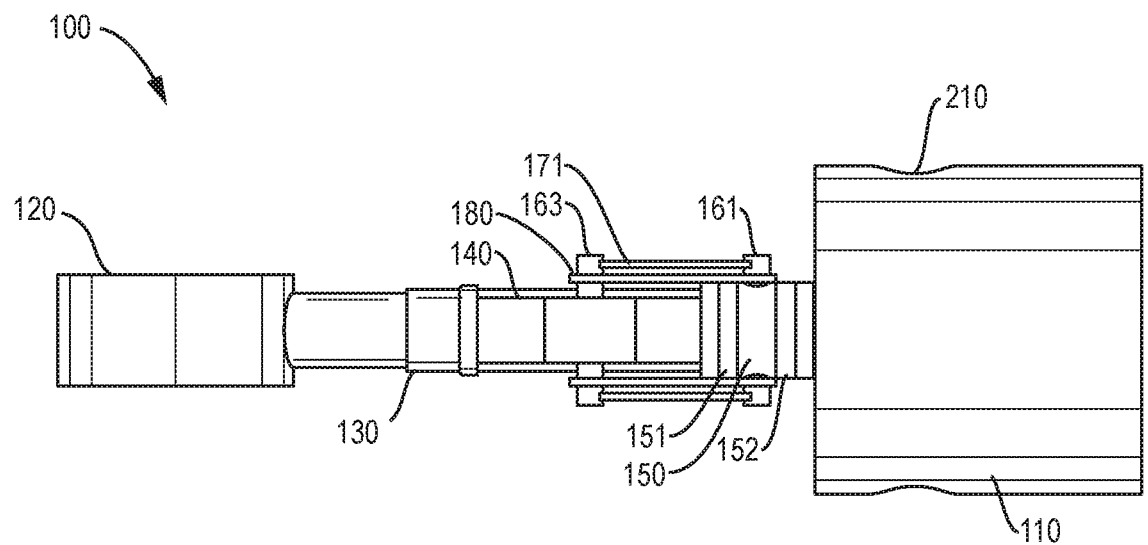
Figure 3C:
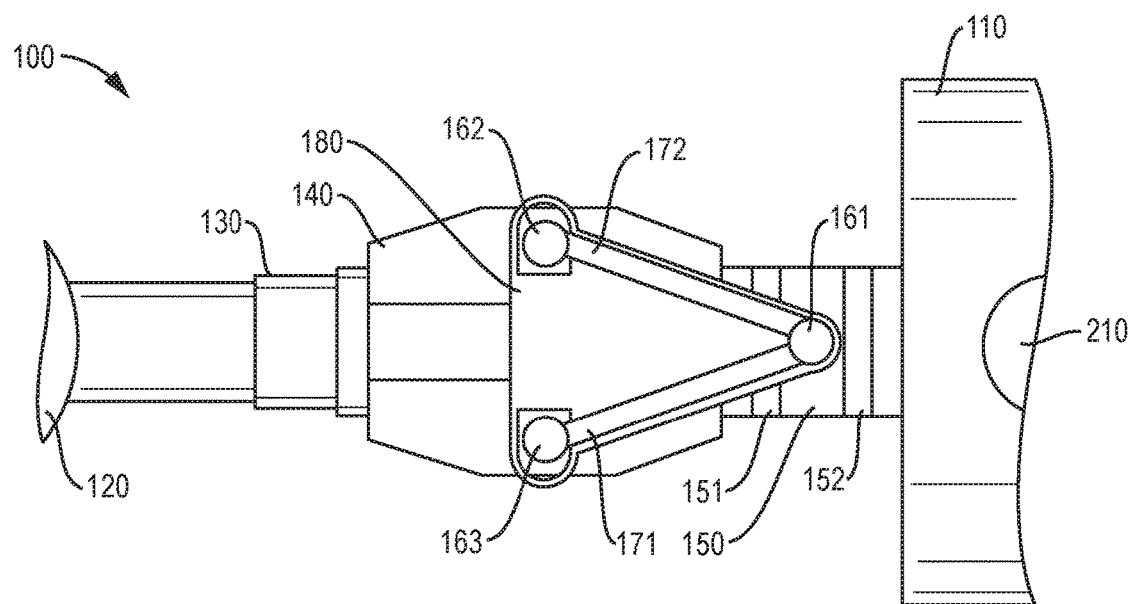
Figure 3D:
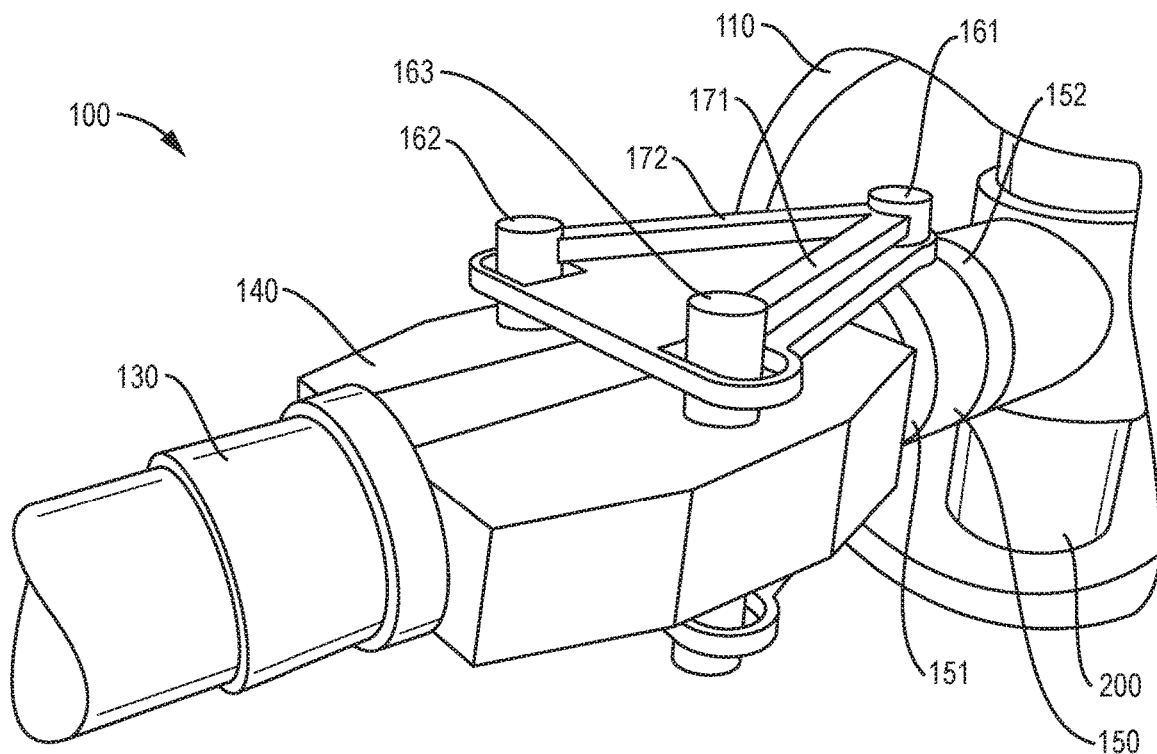
Figure 4A:
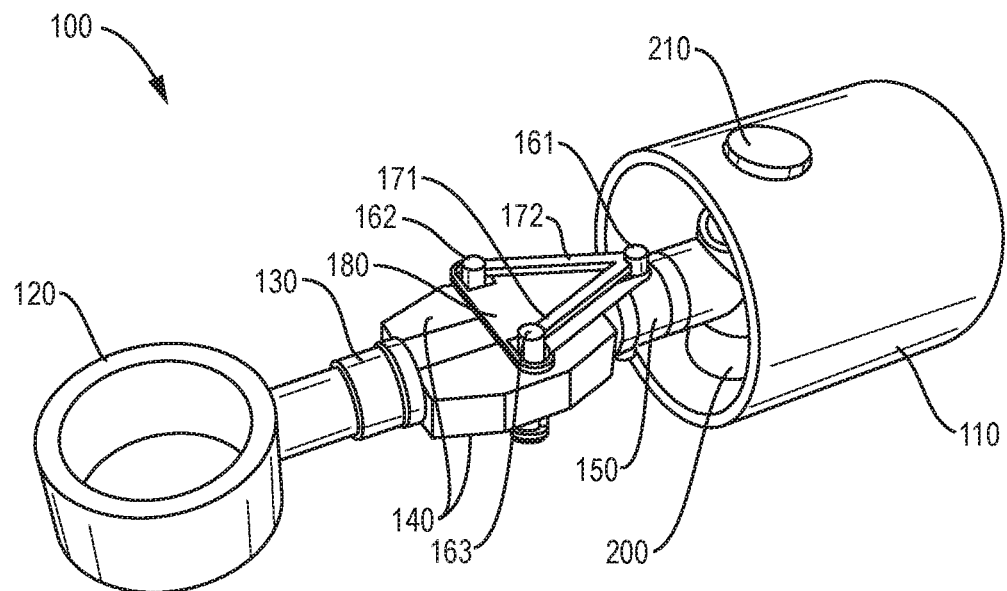
FIGS. 4A-4D are views of the magnetically-actuated piston and connecting rod device of FIGS. 1A and 1B when a current passes through the solenoid wrapped around the cylinder of the engine.
Figure 4B:
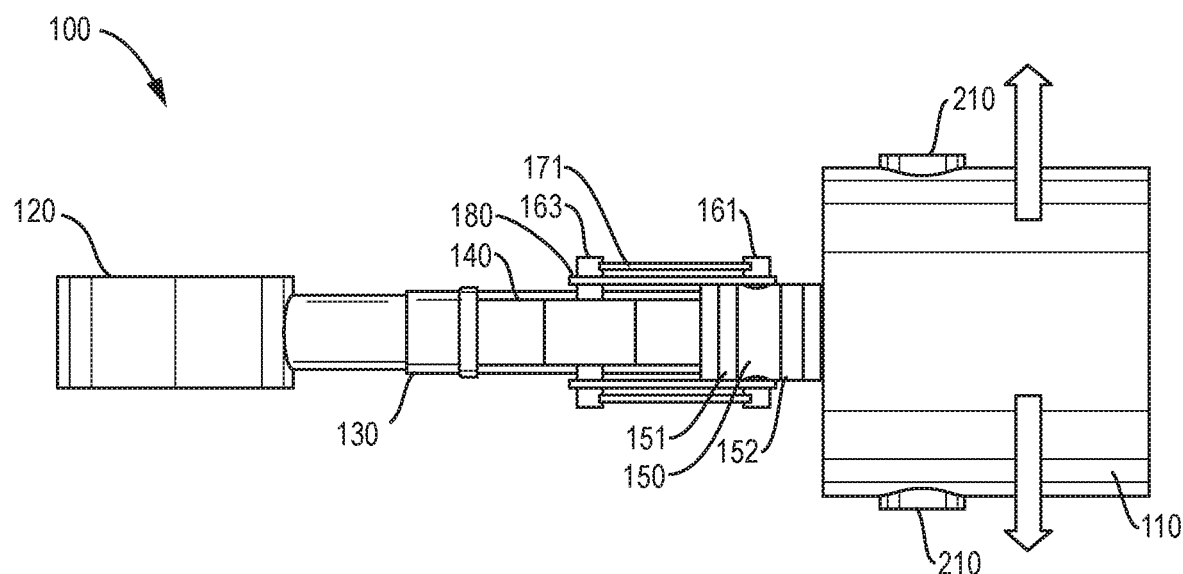
Figure 4C:
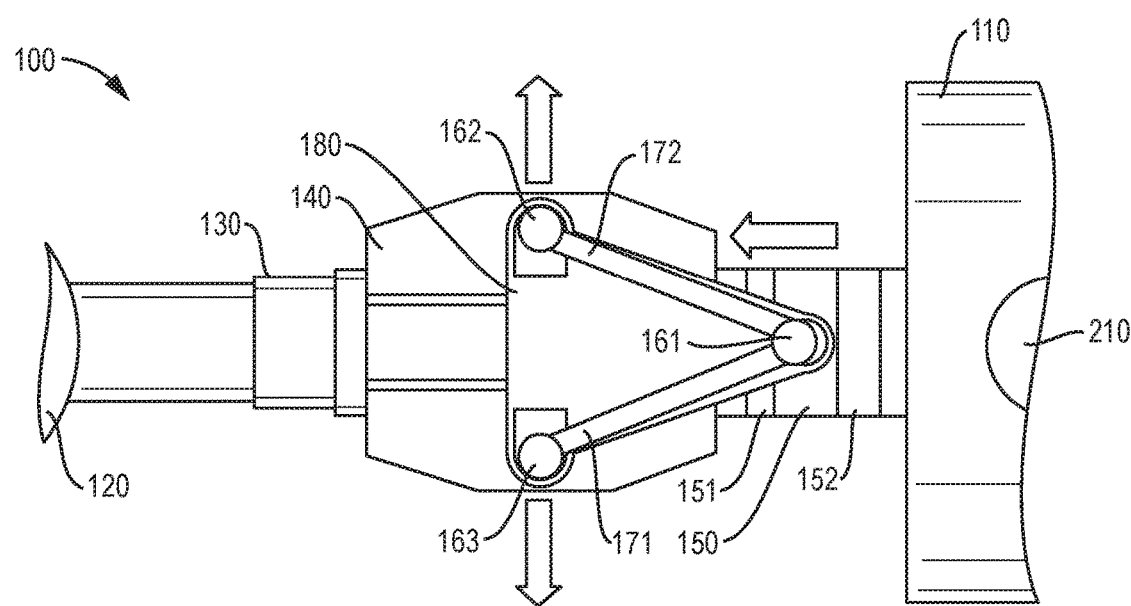
Figure 4D:
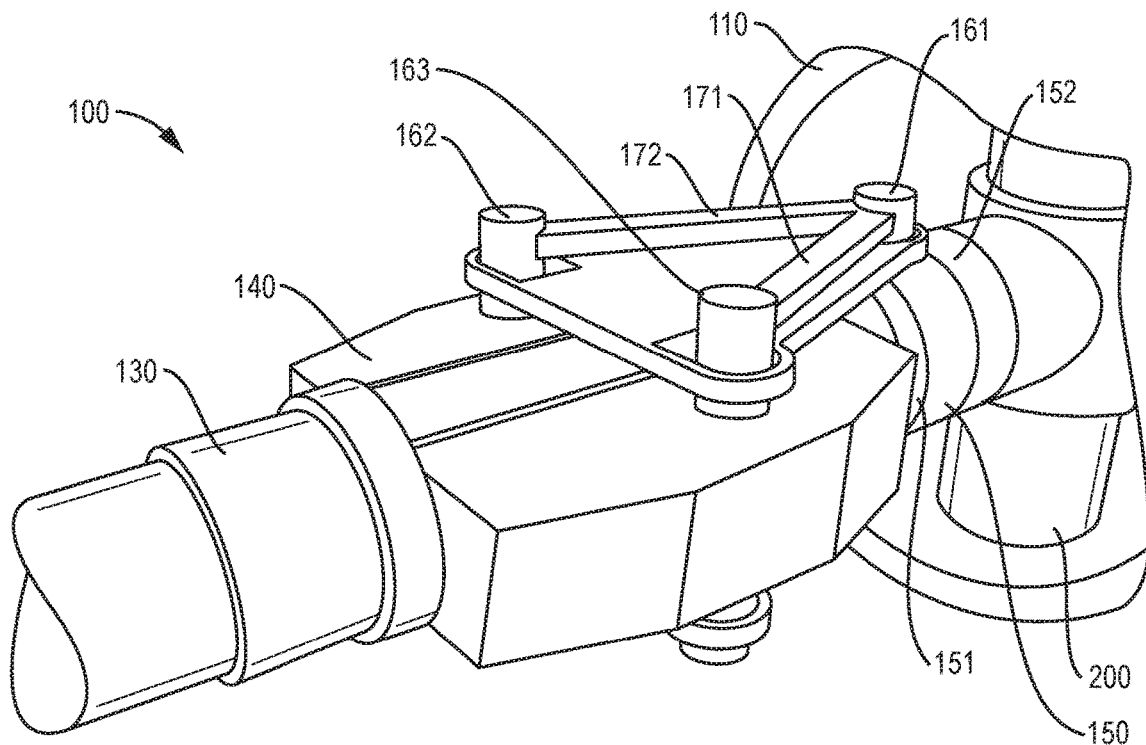

In greater detail, FIG. 2 is a select-component view of the magnetically-actuated piston and connecting rod device 100. For demonstration purposes, the first male-female coupling pad 140, first linkage arm 171, and second joint 163 are removed from view. As shown in FIG. 2, the respective inner walls of the first and second male-female coupling pads 140 can be formed with a curvature corresponding to the outer shape of the male component 120. This can allow the first and second male-female coupling pads 140 to rigidly hold the male component 120 when no magnetic field is present. The first and second male-female coupling pads 140 can hold the male component 120 within the female component 130 at multiple possible positions, allowing for precise compression ratio adjustment.

Referring again to FIGS. 1A and 1B, the connecting rod device can further include a connecting rod magnet 150, which is a magnet coupled to the female component 130 of the variable-length connecting rod. In some embodiments, the connecting rod magnet 150 can be disposed on or around a portion of the body of the female component 130, and shaped in a manner corresponding to the shape of the female component 130 (e.g., cylindrically shaped). As such, the connecting rod magnet 150 can be configured to move over the portion of the body of the female component 130 in response to a magnetic field proximate to the cylinder 400 of the engine along the axis of the connecting rod. Particularly, the connecting rod magnet 150 can move in a first direction in response to a magnetic field proximate to the cylinder 400 and in a second, opposite direction in response to deactivation of the magnetic field proximate to the cylinder 400.

Disposed on opposite axial ends of the connecting rod magnet 150 can be a first spring 151 and a second spring 152. The first and second springs 151, 152 can maintain the connecting rod magnet 150 in a default or centered position when no magnetic field proximate to the cylinder 400 is present. However, when a magnetic field proximate to the cylinder 400 is present, the first spring 151 which is located proximal (i.e., closer to the crankshaft) of the connecting rod magnet 150 can compress due to proximal movement of the connecting rod magnet 150 along the axis of the connecting rod. Axial movement of the connecting rod 150 in response to a magnetic field proximate to the cylinder 400 will be described in greater detail below.

The connecting rod device can further include a series of components connecting the connecting rod magnet 150 to the first and second male-female coupling pads 140. For starters, a plurality of joints 161, 162, and 163 can extend through respective portions of the connecting rod magnet 150 and the first and second male-female coupling pads 140. The plurality of joints 161, 162, and 163 can extend in a direction perpendicular to the axis of the connecting rod. In particular, as shown in FIGS. 1A and 1B, a first joint 162 can extend through a portion of the first male-female coupling pad 140, a second joint 163 can extend through a portion of the second male-female coupling pad 140, and a third joint 161 can extend through a portion of the connecting rod magnet 150. By virtue of the joints 161, 162, and 163 being attached to the first and second male-female coupling pads 140 and the connecting rod magnet 150, each of the joints 161, 162, and 163 can move in unison with the first and second male-female coupling pads 140 and the connecting rod magnet 150, respectively.

The plurality of joints 161, 162, and 163 can be interconnected through a series of linkage arms 171 and 172. For example, a first linkage arm 172 can adjoin the first joint 162, which extends through a portion of the first male-female coupling pad 140, to the third joint 161, which extends through a portion of the connecting rod magnet 150, and a second linkage arm 171 can adjoin the second joint 163, which extends through a portion of the second male-female coupling pad 140, to the third joint 161.

In some embodiments, the linkage arms 171 and 172 can be made of a rigid material such that the linkage arms 171 and 172 do not bend in response to axial movement of the connecting rod magnet 150. Because the linkage arms 171 and 172 adjoin the connecting rod magnet 150 to the first and second male-female coupling pads 140, the axial movement of the connecting rod magnet 150, which necessarily causes movement of the linkage arms 171 and 172 connected to the connecting rod magnet 150 by virtue of the third joint 161, can produce a corresponding movement of the first and second male-female coupling pads 140.

Moreover, axial movement of the connecting rod magnet 150 can cause the linkage arms 171 and 172 to move angularly, or rotate, thereby moving the first and second male-female coupling pads 140 in a direction perpendicular to the axis of the connecting rod. Indeed, when the connecting rod device is in the coupled state, the first and second linkage arms 171 and 172 can extend at a first angle with respect to the axis of the connecting rod, and when the connecting rod device is in the de-coupled state, the first and second linkage arms 171 and 172 can extend at a second angle, different from the first angle, with respect to the axis of the connecting rod. The perpendicular movement of the first and second male-female coupling pads 140 can de-couple the first and second male-female coupling pads 140 from the male component 120, or, in other words, release the male component 120, allowing the male component 120 to move freely inside of the female component 130 along the axis of the connecting rod due to rotation of the crankshaft, as described in greater detail below.

The connecting components can further include a guiding plate 180 disposed between the linkage arms 171 and 172 and the first and second male-female coupling pads 140. The guiding plate 180 can be fixed to the female component 130 such that the guiding plate 180 does not move. In addition, the guiding plate 180 can be formed with a plurality of openings corresponding to the plurality of joints 161, 162, and 163, whereby each opening in the guiding plate can receive one of the joints 161, 162, or 163. The guiding plate openings can be formed with a width to accommodate the above-described movement of the plurality of joints 161, 162, and 163. Particularly, the guiding plate openings which receive the first joint 162 and the second joint 163, respectively, can extend in a direction perpendicular to the axis of the connecting rod so as to accommodate the perpendicular movement of the first joint 162 and the second joint 163 (as the first and second male-female coupling pads 140 move perpendicularly), and similarly, the guiding plate opening which receives the third joint 161 can extend in a direction parallel to the axis of the connecting rod so as to accommodate the axial movement of the third joint 161 (as the connecting rod magnet 150 moves along the axis of the connecting rod).

In some embodiments, a first guiding plate 180 can be disposed on a first side of (e.g., above) the first and second male-female coupling pads 140, and a second guiding plate 180 can be disposed on a second, opposite side of (e.g., below) the first and second male-female coupling pads 140. In such case, the second guiding plate 180 can be disposed between the second side of the first and second male-female coupling pads 140 and a second pair of linkage arms 171 and 172 which interconnect the plurality of joints 161, 162, and 163. The first pair of linkage arms 171 and 172 can attach to respective first end regions (e.g., top) of the joints 161, 162, and 163, while the second pair of linkage arms 171 and 172 can attach to respective second, opposite end regions (e.g., bottom) of the joints 161, 162, and 163. In other embodiments, the connecting rod device can utilize only a single guiding plate 180 and single set of linkage arms 171 and 172.

The magnetically-actuated piston and connecting rod device 100 can further include a piston coupling mechanism 200 disposed at least partially inside of the piston head 110 that couples the connecting rod device to the piston head 110. The piston coupling mechanism 200 can be positioned inside of the piston head 110, in the wrist pin cavity, for example, extending longitudinally in a direction perpendicular to the axis of the connecting rod.

Figure 7A:
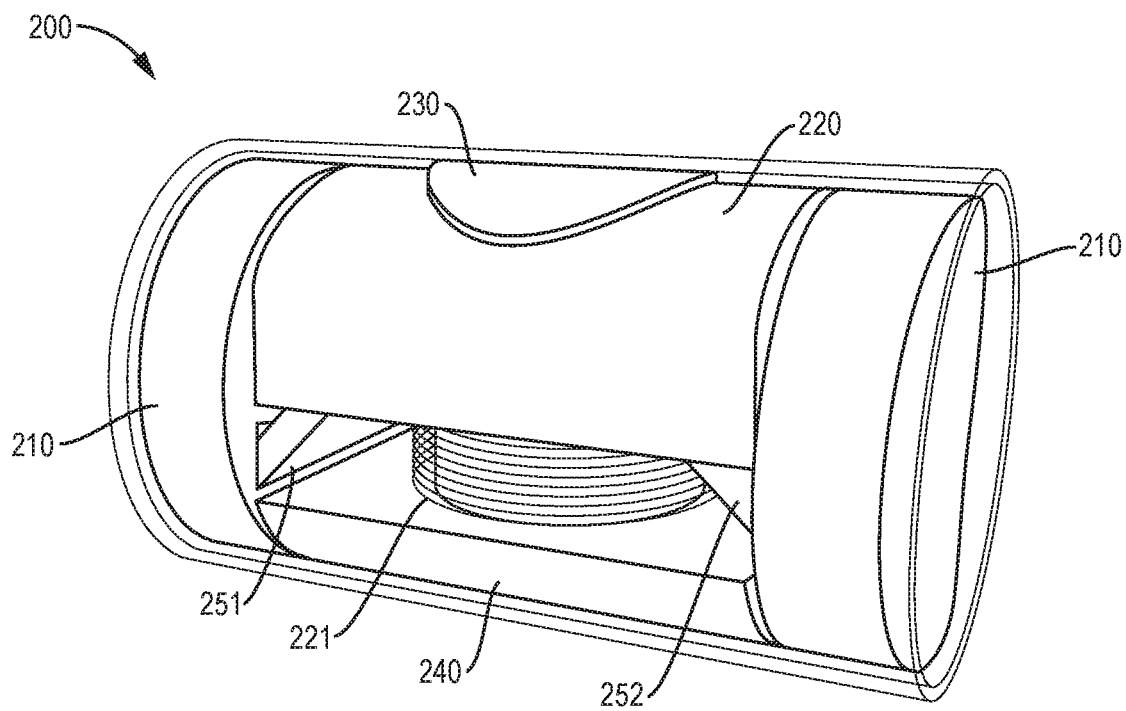
FIGS. 7A and 7B are views of an exemplary piston coupling mechanism when no current is applied to the solenoid wrapped around the cylinder of the engine.
Figure 7B:
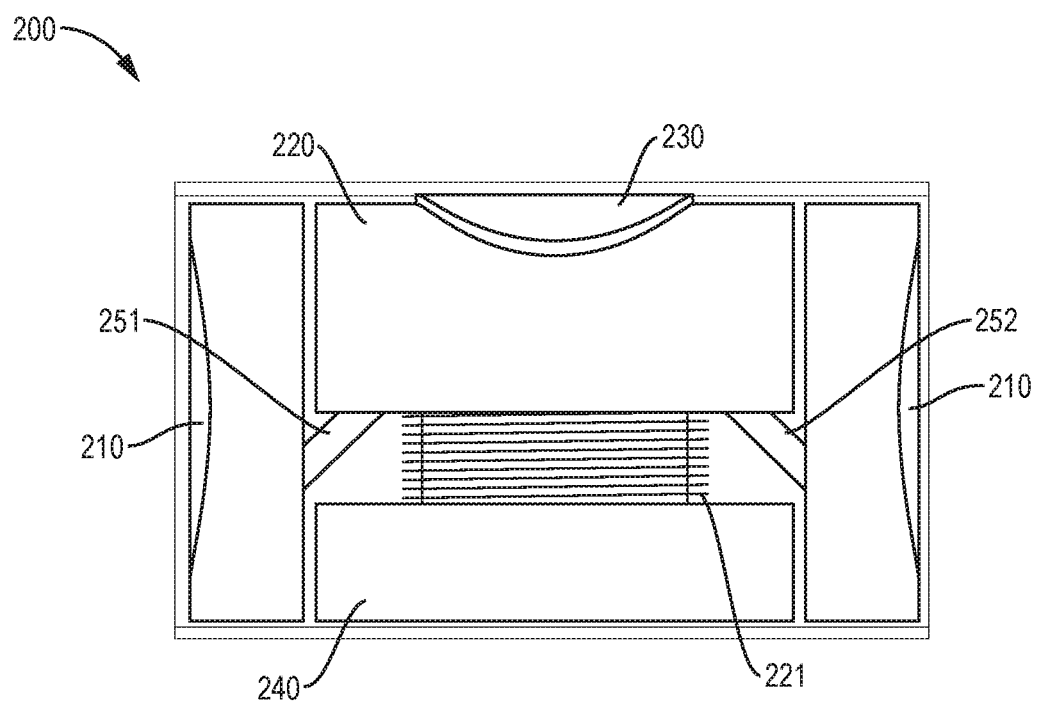
Figure 8A:
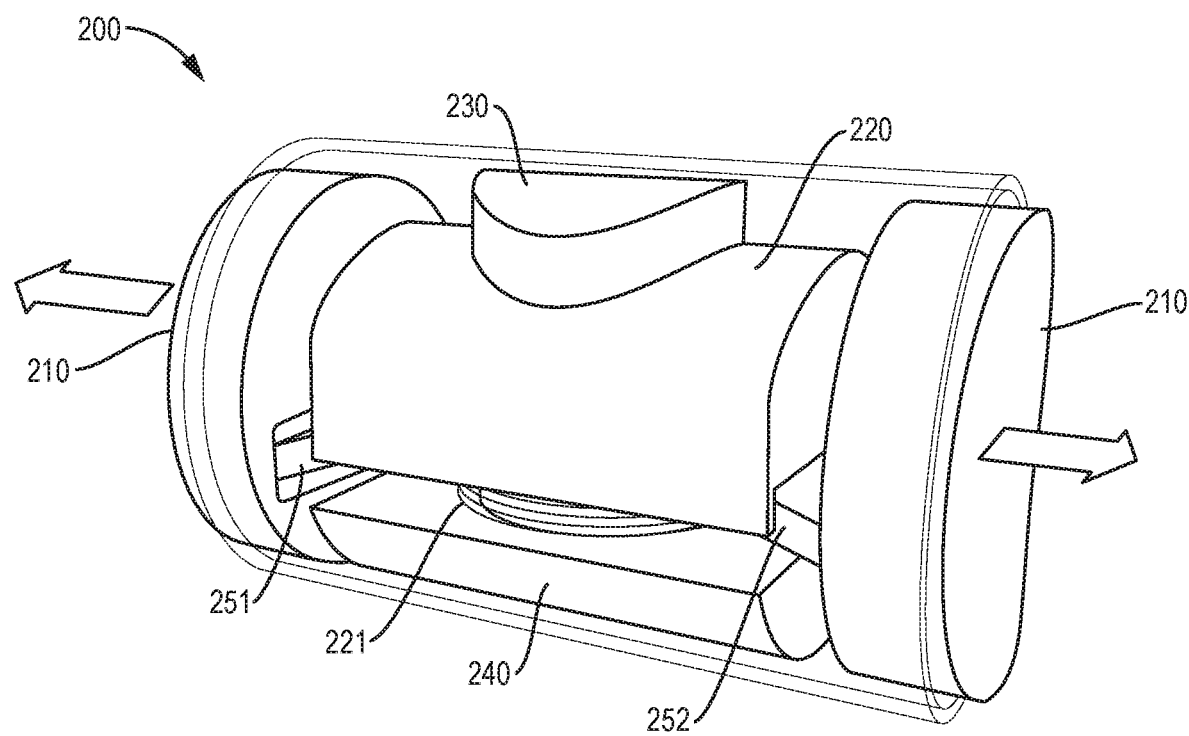
FIGS. 8A and 8B are views of the piston coupling mechanism of FIGS. 7A and 7B when a current passes through the solenoid wrapped around the cylinder of the engine.
Figure 8B:
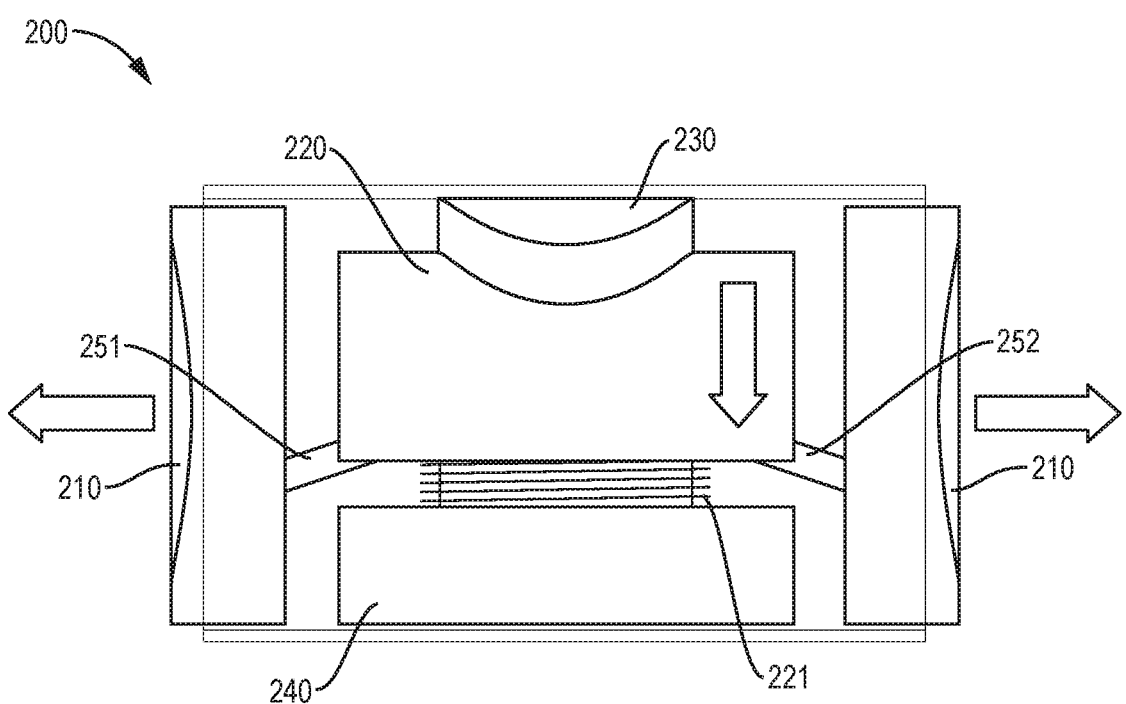

In detail, FIGS. 7A and 7B are views of an exemplary piston coupling mechanism when a magnetic field proximate to the cylinder 400 is inactive (i.e., no current is applied to the solenoid 410), and FIGS. 8A and 8B are views of the piston coupling mechanism when such magnetic field is active (i.e., current passes through the solenoid 410). Activation and deactivation of the magnetic field proximate to the cylinder 400 will be described in greater detail below.

As shown in FIGS. 7A, 7B, 8A, and 8B, the piston coupling mechanism 200 can include first and second piston-cylinder coupling pads 210 movably disposed at opposite axial ends of the piston coupling mechanism 200, respectively. The first and second piston-cylinder coupling pads 210 can be configured to move along the axis of the piston coupling mechanism 200 (perpendicular to the axis of the connecting rod) in opposite directions of each other. In this regard, the piston head 110 can be formed with openings therein shaped to receive the first and second piston-cylinder coupling pads 210, respectively. In a neutral state, the first and second piston-cylinder coupling pads 210 can be positioned inside of an outer wall of the piston head 110; however, these openings permit the first and second piston-cylinder coupling pads 210 to move along the axis of the piston coupling mechanism 200 outside of the outer wall of the piston head 110 under certain circumstances described in greater detail below.

The piston coupling mechanism 200 can further include a piston coupling mechanism magnet 220 movably disposed at least partially between the first and second piston-cylinder coupling pads 210. The piston coupling mechanism magnet 220 can be formed with an opening through which a guiding rod 230 extends perpendicular to the axis of the piston coupling mechanism 200. The guiding rod 230 can be attached at one end to a fixed base member 240 and extend outwardly therefrom. A spring 221 can be disposed on or around the guiding rod 230 between the piston coupling mechanism magnet 220 and the base member 240.

The guiding rod 230 can be configured to guide the movement of the piston coupling mechanism magnet 220 in a direction perpendicular to the axis of the piston coupling mechanism 200. In this regard, magnetic forces resulting from a magnetic field proximate to the cylinder 400 can push the piston coupling mechanism magnet 220 along the guiding rod 230 toward the base member 240 in a direction perpendicular to the axis of the piston coupling mechanism 200. Such movement can compress the spring 221. Upon deactivation of the magnetic field, the spring 221 can decompress causing the piston coupling mechanism magnet 220 to move in the opposite direction perpendicular to the axis of the piston coupling mechanism 200, returning the piston coupling mechanism magnet 220 to its default state.

The piston coupling mechanism 200 can further include linkage arms 251 and 252. For example, a first linkage arm 251 can adjoin the piston coupling mechanism magnet 220 to the first piston-cylinder coupling pad 210, and a second linkage arm 252 can adjoin the piston coupling mechanism magnet 220 to the second piston-cylinder coupling pad 210 disposed at an opposite side of the piston coupling mechanism 200 as the first piston-cylinder coupling pad 210.

In some embodiments, the linkage arms 251 and 252 can be made of a rigid material such that the linkage arms 251 and 252 do not bend in response to movement of the piston coupling mechanism magnet 220. Because the linkage arms 251 and 252 adjoin the piston coupling mechanism magnet 220 to the first and second piston-cylinder coupling pads 210, the movement of the piston coupling mechanism magnet 220 in a direction perpendicular to the axis of the piston coupling mechanism 200, which necessarily causes movement of the linkage arms 251 and 252, can produce a corresponding movement of the first and second piston-cylinder coupling pads 210.

Moreover, movement of the piston coupling mechanism magnet 220 in a direction perpendicular to the axis of the piston coupling mechanism 200 can cause the linkage arms 251 and 252 to move angularly, or rotate, thereby moving the first and second piston-cylinder coupling pads 210 along the axis of the piston coupling mechanism 200. Indeed, when the piston coupling mechanism 200 is in the retracted state, the first and second linkage arms 251 and 252 can extend at a first angle with respect to the axis of the piston coupling mechanism 200, and when the piston coupling mechanism 200 is in the extended state, the first and second linkage arms 251 and 252 can extend at a second angle, different from the first angle, with respect to the axis of the piston coupling mechanism 200. The axial movement of the first and second piston-cylinder coupling pads 210 can move the coupling pads 210 through the openings formed in the piston head 110 outside of the piston head 110, such that the first and second piston-cylinder coupling pads 210 abut an inner surface of the cylinder 400 to immobilize or hold the piston head 110 in place inside of the cylinder 400, as described in greater detail below.

When the magnetic field causing movement of the piston coupling mechanism magnet 220 is deactivated, the spring 221 can decompress, thus returning the piston coupling mechanism magnet 220 to its default position. The return movement of the piston coupling mechanism magnet 220 can retract the linkage arms 251 and 252 and pull the first and second piston-cylinder coupling pads 210 back to their retracted position inside of the walls of the piston head 110. Thus, the piston coupling mechanism magnet 220 can be configured to move in a first direction in response to the magnetic field proximate to the cylinder 400 and in a second, opposite direction in response to deactivation of the magnetic field.

Referring next to FIGS. 3A-3D and FIGS. 4A-4D, the operation of the magnetically-actuated piston and connecting rod device 100 can be described. In detail, the connecting rod device can be configured to transition between a "coupled state" and a "de-coupled state," as explained below, in response to a magnetic field proximate to the cylinder 400 in which the magnetically-actuated piston and connecting rod device 100 is disposed. Also, the piston coupling mechanism 200 can be configured to transition between a "retracted state" and an "extended state," as explained below, in response to the magnetic field proximate to the cylinder 400 in which the magnetically-actuated piston and connecting rod device 100 is disposed.

The magnetic field can be generated by wrapping a solenoid 410 (e.g., see FIGS. 5A-C and 6A-C) around each cylinder 400 of the engine. When an electric current is applied to the solenoid 410, such that the current passes through the coils of the solenoid 410, magnetic forces act down the length of the cylinder 400, thereby generating a magnetic field. The magnetic field can cause responsive movement of magnetic bodies within the magnetic field, such as the connecting rod magnet 150 or piston coupling mechanism magnet 220, due to attractive or repulsive magnetic forces acting upon the bodies.

Referring first to FIGS. 3A-3D, which include a perspective view, a side view, a top view, and a close-up perspective view, respectively, of the magnetically-actuated piston and connecting rod device 100, no current is applied to the solenoid 410 which is wrapped around cylinder 400. Thus, in the example of FIGS. 3A-3D, the magnetic field proximate to the cylinder 400 may be inactive, resulting in the coupled state of the connecting rod device and the retracted state of the piston coupling mechanism 200.

Here, the connecting rod magnet 150 can be held in a default or centered position by virtue of first and second springs 151 and 152. While the connecting rod magnet 150 is centered, the first and second male-female coupling pads 140 can be withdrawn, i.e., positioned against the male component 120, due to being connected to the connecting rod magnet 150 via the plurality of joints 161, 162 and 163 and linkage arms 171 and 172. In this position, the respective inner surfaces of the first and second male-female coupling pads 140 can abut the outer surface of the male component 120 on opposing sides thereof in order to hold the male component 120 in place within the female component 130. The first and second male-female coupling pads 140 can apply counteracting forces on the male component 120 in a direction perpendicular to the axis of the connecting rod. Therefore, the male component 120 can be held in unison with the female component 130, and unable to move independently of the female component 130, in the coupled state of the connecting rod device.

Additionally, in the absence of the magnetic field proximate to the cylinder 400, the first and second piston-cylinder coupling pads 210 can be retracted, or withdrawn, in the piston head 110. That is, the first and second piston-cylinder coupling pads 210 can be positioned inside of an outer wall of the piston head 110. In this position, the piston head 110 is able to move freely within the cylinder 400 due to regular operation of the engine.

Next, referring to FIGS. 4A-4D, which include a perspective view, a side view, a top view, and a close-up perspective view, respectively, of the magnetically-actuated piston and connecting rod device 100, a current passes through the solenoid 410 wrapped around the cylinder 400, thereby generating a magnetic field along the length of the cylinder 400. Thus, in the example of FIGS. 4A-4D, the magnetic field proximate to the cylinder 400 may be active, resulting in the de-coupled state of the connecting rod device and the extended state of the piston coupling mechanism 200.

Here, the connecting rod magnet 150 can move down the length of the female component 130, that is, proximally (toward the male component 120) along the axis of the connecting rod, in response to the generated magnetic field, thereby compressing the first spring 151 proximal of the connecting rod magnet 150. Because the connecting rod magnet 150 is connected to the first and second male-female coupling pads 140 via the plurality of joints 161, 162, and 163 and linkage arms 171 and 172, the first and second male-female coupling pads 140 can move outwardly from the male component 120, that is, perpendicular to the axis of the connecting rod, thus separating from the male component 120. When the first and second male-female coupling pads 140 move in this manner, the male component 120 may no longer be rigidly held inside of the female component 130, causing a release of the male component 120, and a de-coupling of the male component 120 from the female component 130. This can "unlock" the male component 120 such that it is allowed to move independent of the female component 130 along the axis of the connecting rod due to the inertia of the normal crankshaft motion (rotation), thereby adjusting the effective length of the connecting rod. The springs 151 and 152 can return the connecting rod magnet 150 to its centered, "default" position once the current applied to the solenoid 410 stops.

Additionally, in response to the generated magnetic field, the piston coupling mechanism 200 can be activated, causing the piston coupling mechanism magnet 220 to move along the guiding rod 230 in a direction perpendicular to the piston coupling mechanism 200 (toward the fixed base member 240). Such movement of the piston coupling mechanism magnet 220 can cause the first and second piston-cylinder coupling pads 210 to move along the axis of the piston coupling mechanism 200, so as to extend beyond the outer wall of the piston head 110, into the inner wall of the engine cylinder 400. This can hold the piston head 110, and the female component 130 attached thereto, in place inside of the cylinder 400.

The de-coupling of the male component 120 and female component 130, along with the coupling of the piston head 110 to the inner wall of the cylinder 400, can enable the male component 120 to freely move within the female component 130 while current passes through the solenoid 410. This can allow for dynamic adjustment of connecting rod length based on the point in time during the combustion cycle at which the current activates, as described in greater detail with reference to FIGS. 12-16.

Figure 5C:
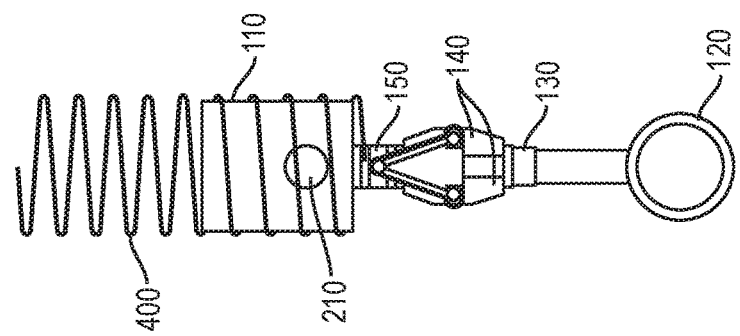
FIGS. 5A-C are operational views showing an exemplary process of lengthening the connecting rod of the magnetically-actuated piston and connecting rod device of FIGS. 1A and 1B.
Figure 5B:
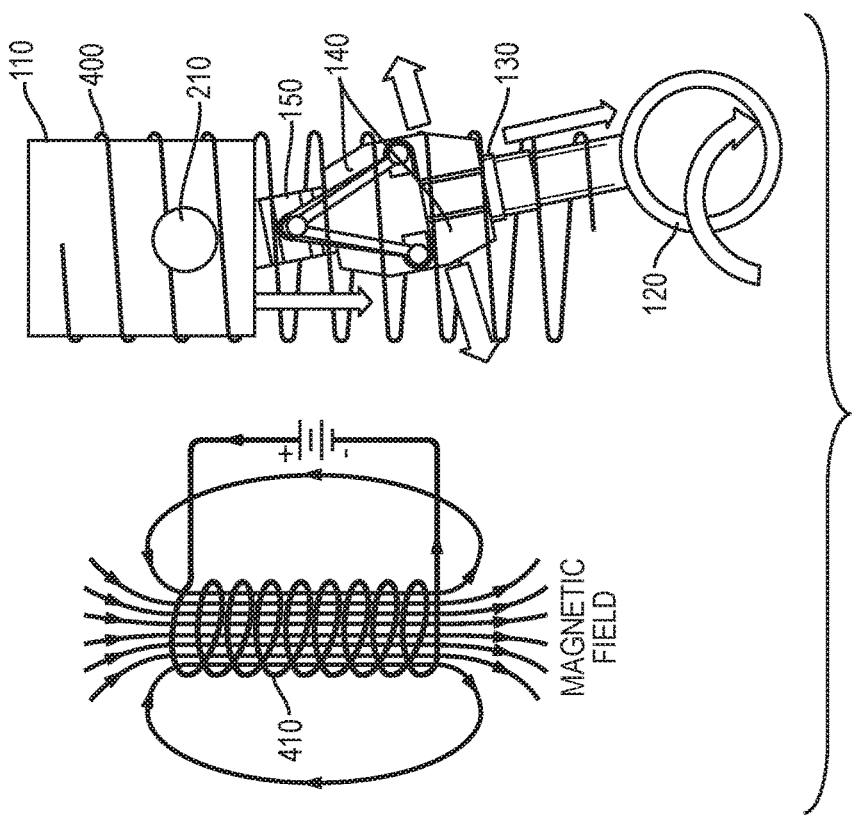
Figure 5A:
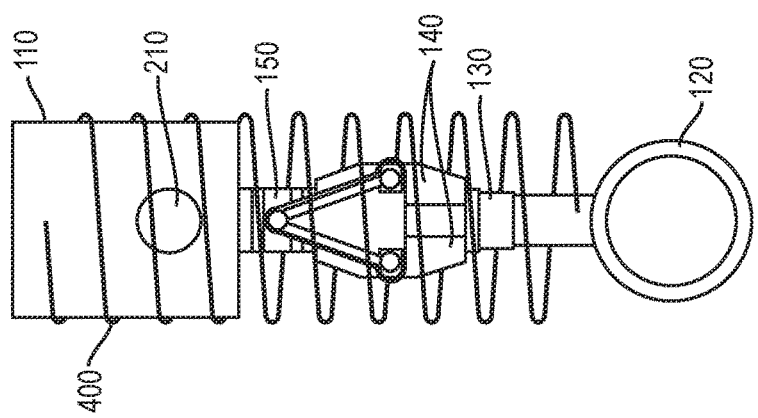
Figure 6A:
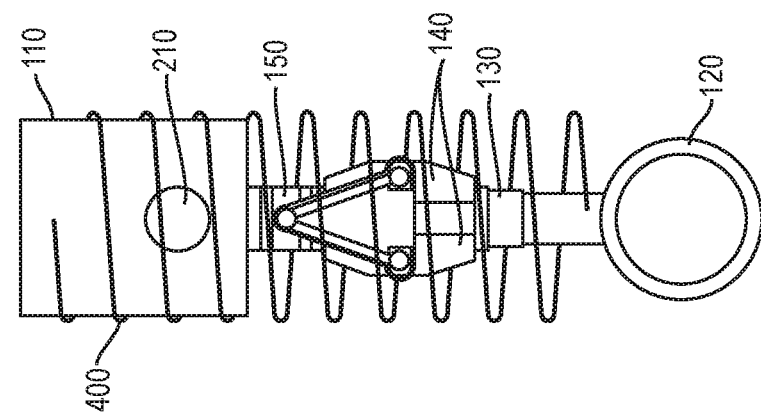
FIGS. 6A-C are operational views showing an exemplary process of shortening the connecting rod of the magnetically-actuated piston and connecting rod device of FIGS. 1A and 1B.
Figure 6B:
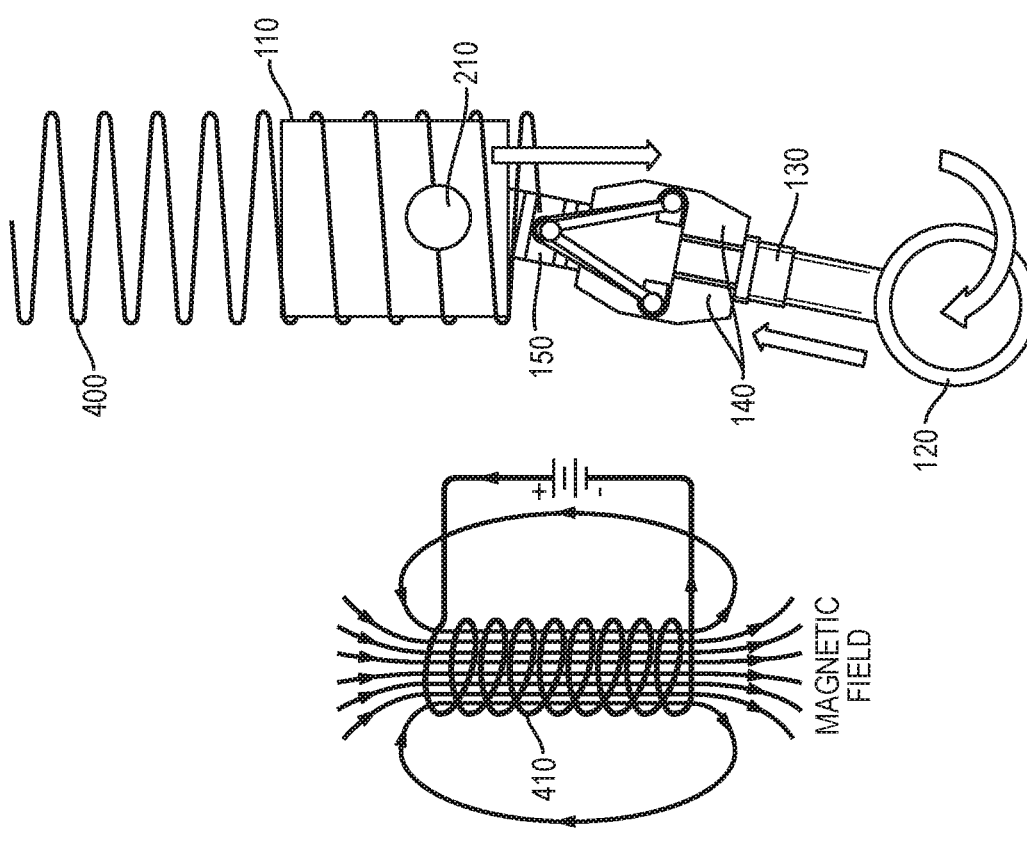
Figure 6C:
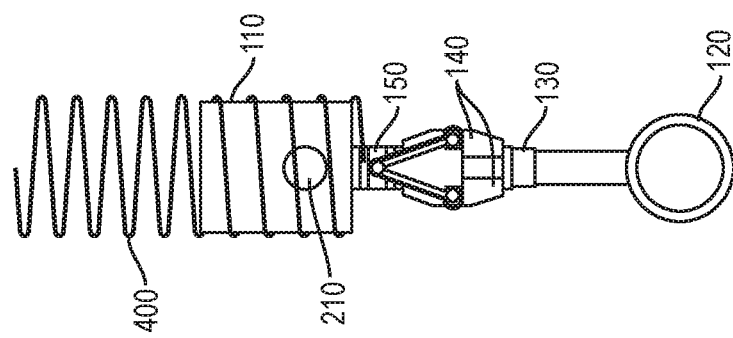

Next, FIGS. 5A-C are operational views showing an exemplary process of lengthening the connecting rod of the magnetically-actuated piston and connecting rod device 100, and FIGS. 6A-C are operational views showing an exemplary process of shortening the connecting rod of the magnetically-actuated piston and connecting rod device 100. In each of FIGS. 5A-C and 6A-C, the vertically extending helix line represents the solenoid 410 wrapped around the cylinder 400. It is to be understood that the depictions of FIGS. 5A-C and 6A-C can replicated in each cylinder 400 of the engine. As a result, the compression ratio of each cylinder 400 can be individually adjusted.

Referring first to FIGS. 5A-C, the engine is operating, and the piston head 110 can be positioned at or near top dead center (TDC) at stage A. Here, no electric current is applied to the solenoid 410, and thus the magnetic field proximate to the cylinder 400 is inactive. That is, there can be no magnetic field capable of moving magnetic bodies in the magnetically-actuated piston and connecting rod device 100. In such case, the connecting rod device can be in the coupled state, and the piston coupling mechanism can be in the retracted state, as explained above.

At stage B, current can be passed through the solenoid 410, generating a magnetic field along the length of the cylinder 400. This can activate the connecting rod magnet 150 of the connecting rod device and the piston coupling mechanism magnet 220 of the piston coupling mechanism 200 due to magnetic forces acting in the direction shown by the arrows through solenoid 410. As explained above, activation of the connecting rod magnet 150, whereby the connecting rod magnet 150 moves proximally along the axis of the connecting rod, can transition the connecting rod device to the de-coupled state in which the first and second male-female coupling pads 140 release the male component 120, allowing the male component 120 to move independently of the female component 130. Similarly, activation of the piston coupling mechanism magnet 220, whereby the piston coupling mechanism magnet 220 moves down the length of the guiding rod 230 in a direction perpendicular to an axis of the piston coupling mechanism 200 (toward the base member 240), can transition the piston coupling mechanism 200 to the extended state. Here, the downward movement of the piston coupling mechanism magnet 220 can cause the linkage arms 251 and 252 to push the first and second piston-cylinder coupling pads 210 along the axis of the piston coupling mechanism 200, in opposite directions, outside of an outer wall of the piston head 110, such that the first and second piston-cylinder coupling pads 210 abut an inner surface of the cylinder 400 to immobilize or hold the piston head 110 in place inside of the cylinder 400. Consequently, inertia due to the regular rotational motion of the crankshaft can pull on the male component 120, causing the male component 120 to slide vertically out of the female component 130, while the female component 130 is prevented from moving vertically due to its connection to the fixed piston head 110.

At stage C, the current applied to the solenoid 410 can be deactivated. In response, the connecting rod device can transition back to the coupled state, in which the male and female components 120 and 130 are coupled together, and the piston coupling mechanism 200 can transition back to the retracted state, in which the piston head 110 is de-coupled from the inner walls of the cylinder 400. The effective length of the connecting rod is now longer than if current had not be activated.

Referring next to FIGS. 6A-C, the engine is operating, and the piston head 110 can be positioned at or near bottom dead center (BDC) at stage A—as opposed to TDC at stage A of FIGS. 5A-C. Here, no electric current is applied to the solenoid 410, and thus the magnetic field proximate to the cylinder 400 is inactive. That is, there can be no magnetic field capable of moving magnetic bodies in the magnetically-actuated piston and connecting rod device 100. In such case, the connecting rod device can be in the coupled state, and the piston coupling mechanism can be in the retracted state, as explained above.

At stage B, current can be passed through the solenoid 410, generating a magnetic field along the length of the cylinder 400. This can activate the connecting rod magnet 150 of the connecting rod device and the piston coupling mechanism magnet 220 of the piston coupling mechanism 200 due to magnetic forces acting in the direction shown by the arrows through solenoid 410. As explained above, activation of the connecting rod magnet 150, whereby the connecting rod magnet 150 moves proximally along the axis of the connecting rod, can transition the connecting rod device to the de-coupled state in which the first and second male-female coupling pads 140 release the male component 120, allowing the male component 120 to move independently of the female component 130. Similarly, activation of the piston coupling mechanism magnet 220, whereby the piston coupling mechanism magnet 220 moves down the length of the guiding rod 230 in a direction perpendicular to an axis of the piston coupling mechanism 200 (toward the base member 240), can transition the piston coupling mechanism 200 to the extended state. Here, the downward movement of the piston coupling mechanism magnet 220 can cause the linkage arms 251 and 252 to push the first and second piston-cylinder coupling pads 210 along the axis of the piston coupling mechanism 200, in opposite directions, outside of an outer wall of the piston head 110, such that the first and second piston-cylinder coupling pads 210 abut an inner surface of the cylinder 400 to immobilize or hold the piston head 110 in place inside of the cylinder 400. Consequently, inertia due to the regular rotational motion of the crankshaft can push the male component 120, causing the male component 120 to slide vertically into the female component 130, while the female component 130 is prevented from moving vertically due to its connection to the fixed piston head 110.

At stage C, the current applied to the solenoid 410 can be deactivated. In response, the connecting rod device can transition back to the coupled state, in which the male and female components 120 and 130 are coupled together, and the piston coupling mechanism 200 can transition back to the retracted state, in which the piston head 110 is de-coupled from the inner walls of the cylinder 400. The effective length of the connecting rod is now shorter than if current had not be activated.

The connecting rod device, as described herein, is not limited solely to the design described herein above. Various modifications to the connecting rod device are acceptable, as would be appreciated by a person of ordinary skill in the art, so long as such changes are consistent with the scope of the accompanying claims.

Figure 9A:
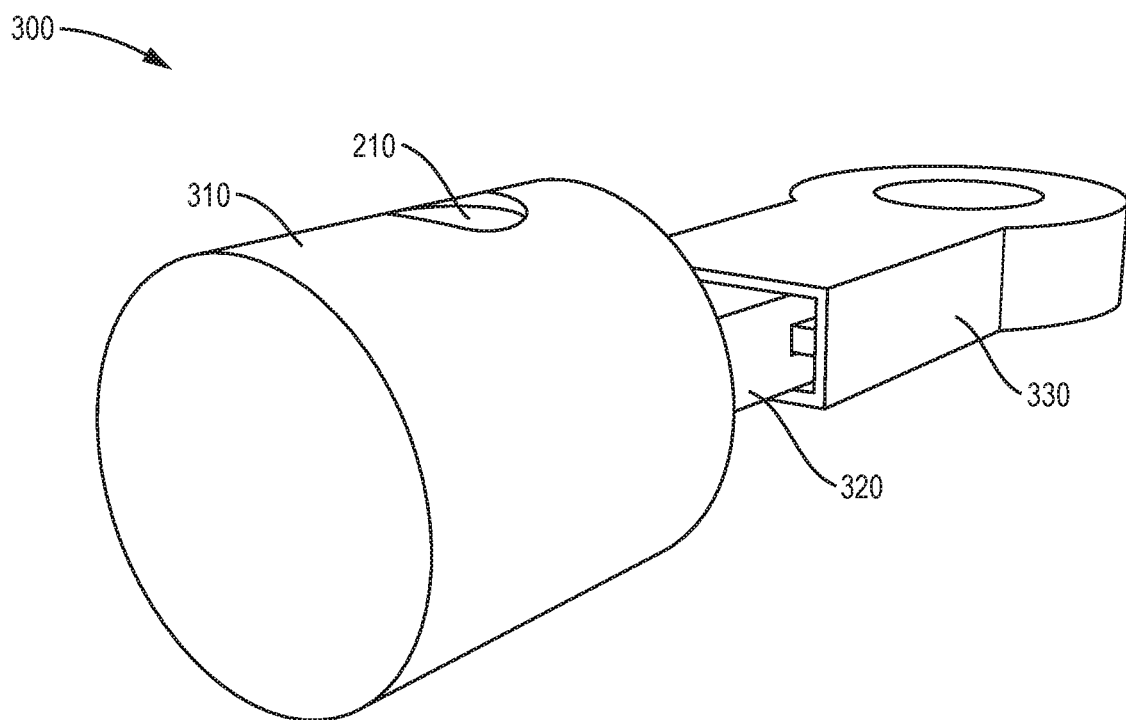
FIGS. 9A and 9B are views of another exemplary magnetically-actuated piston and connecting rod device with a variable-length connecting rod.
Figure 9B:
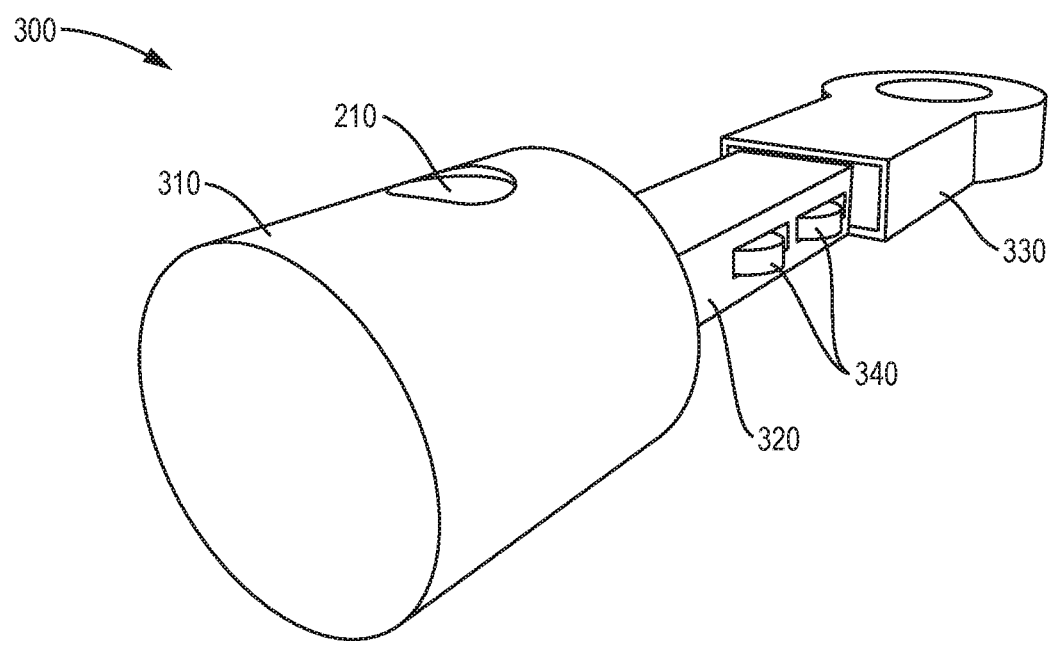

For example, FIGS. 9A and 9B are views of another exemplary magnetically-actuated piston and connecting rod device with a variable-length connecting rod. As shown in FIGS. 9A and 9B, the magnetically-actuated piston and connecting rod device 300 can include a piston head 310, which can generally correspond to the piston head 110 described hereinabove, coupled to a connecting rod device extending therefrom. The piston head 310 can be disposed inside of the cylinder 400. While only a single piston and connecting rod device 300 is shown in FIGS. 9A and 9B, the magnetically-actuated piston and connecting rod device 300 can be disposed in each cylinder 400 of the engine.

The magnetically-actuated piston and connecting rod device 300 can further include a connecting rod device coupled to the piston head 310 and extending therefrom. Generally similar to the connecting rod device of the magnetically-actuated piston and connecting rod device 100 described hereinabove, the connecting rod device of the magnetically-actuated piston and connecting rod device 300 can include a variable-length connecting rod with a male component 320 and a female component 330. The female component 330 can be formed with an at least partially hollow body. The male component 320 can be formed such that at least a portion thereof can be disposed inside of the hollow body of the female component 330.

In contrast with the magnetically-actuated piston and connecting rod device 100, a proximal end of the male component 320 (furthest from the piston head 310) can be inserted into the female component 330, and a distal end of the male component 320 (closest to the piston head 310) can be coupled to the piston head 310 via the piston coupling mechanism 200. (The piston coupling mechanism 200 can operate in the same manner as described hereinabove and thus remain unchanged.) Meanwhile, a distal end of the female component 330 can include an opening configured to receive the proximal end of the male component 320, and a proximal end of the female component 330 can be formed with a circular opening configured to receive the crankshaft (not shown).

Each of the male component 320 and female component 330 can be rectangularly shaped in some embodiments, but the respective shapes of the male component 320 and female component 330 are not limited thereto. Under certain circumstances as described herein, the female component 330 can move back and forth over the male component 320 along the axis of the connecting rod, thereby varying the length of the connecting rod. The male component 320, meanwhile, can remain positionally fixed with respect to the connecting rod device by virtue of its connection to the piston head 310.

The connecting rod device can further include a plurality of rollers 340 rotatably disposed in or on the male component 320. The rollers 340 can be wheel-like, i.e., circularly shaped with a circumferential base portion, and capable of rotation about an axis. The rollers 340 can be disposed partially inside of the body of the male component 320 such that a portion of each roller 340 extends outside of an outer wall of the male component 320. As such, an outer surface of one or more of the rollers 340 can come into contact with an inner surface of the female component 330 when a portion of the male component 320 is positioned therein, allowing the male component 320 to slide within the female component 330. In some embodiments, the rollers 340 can include one or more first rollers 340 disposed at a first side of the male component 320 and one or more second rollers 340 disposed at a second, opposite side of the male component 320. While the rollers 340 may be referred to herein in the plural, it is to be understood that the connecting rod device can include only a single roller 340 in certain embodiments.

The connecting rod device can further include a connecting rod magnet 350, which is a magnet movably coupled to the male component 320 proximate to the position of the plurality of rollers 340. In some embodiments, the connecting rod magnet 350 can be disposed entirely inside of the body of the male component 320, as shown in the cross-sectional views of FIGS. 10A-10C and 11A-11C. The connecting rod magnet 350 can be configured to move along the axis of the connecting rod in response to a magnetic field that is generated proximate to the cylinder 400.

Moreover, under certain circumstances described below, an outer surface the connecting rod magnet 350 can come into contact with the respective outer surfaces of the rollers 340 in order to prevent rotation thereof. To this end, the connecting rod magnet 350 can be formed with one or more curved surfaces each of which adjacent to a respective position of the rollers 340. The curvature of the connecting rod magnet 350, visible in FIGS. 10A-10C and 11A-11C, can match or be similar to the curvature of the rollers 340 to maximize surface contact, i.e., friction, between the connecting rod magnet 350 and the rollers 340.

The connecting rod device can further include springs 351 and 352 disposed on opposite axial ends of the connecting rod magnet 350. For example, the first spring 351 can be disposed proximally of the connecting rod magnet 350, and the second spring 352 can be disposed distally of the connecting rod magnet 350. Proximal movement of the connecting rod magnet 350 (toward the female component 330) along the axis of the connecting rod, in response to a magnetic field proximate to the cylinder 400, can cause the first spring 351 to compress. Upon deactivation of the magnetic field, the first spring 351 can decompress to return the connecting rod magnet 350 to its default or centered position. It is to be understood that the springs 351 and 352 are not limited in their respective amounts. That is, the first spring 351 may include one or multiple first springs, and the second spring 352 may include one or second first springs.

Referring next to FIGS. 10A-10C and FIGS. 11A-11C, the operation of the magnetically-actuated piston and connecting rod device 300 can be described. In detail, the connecting rod device can be configured to transition between a "locked state" and a "unlocked state" (similar to the aforementioned "coupled" and "de-coupled" states, respectively), as explained below, in response to a magnetic field proximate to the cylinder 400 in which the magnetically-actuated piston and connecting rod device 300 is disposed. As previously explained, the piston coupling mechanism 200 can be configured to transition between a "retracted state" and an "extended state," as explained below, in response to the magnetic field proximate to the cylinder 400 in which the magnetically-actuated piston and connecting rod device 300 is disposed.

As described above, the magnetic field can be generated by wrapping a solenoid 410 (e.g., see FIGS. 5A-C and 6A-C) around each cylinder 400 of the engine. When an electric current is applied to the solenoid 410, such that the current passes through the coils of the solenoid 410, magnetic forces act down the length of the cylinder 400, thereby generating a magnetic field. The magnetic field can cause responsive movement of magnetic bodies within the magnetic field, such as the connecting rod magnet 350 or piston coupling mechanism magnet 220, due to attractive or repulsive magnetic forces acting upon the bodies.

Figure 10A:
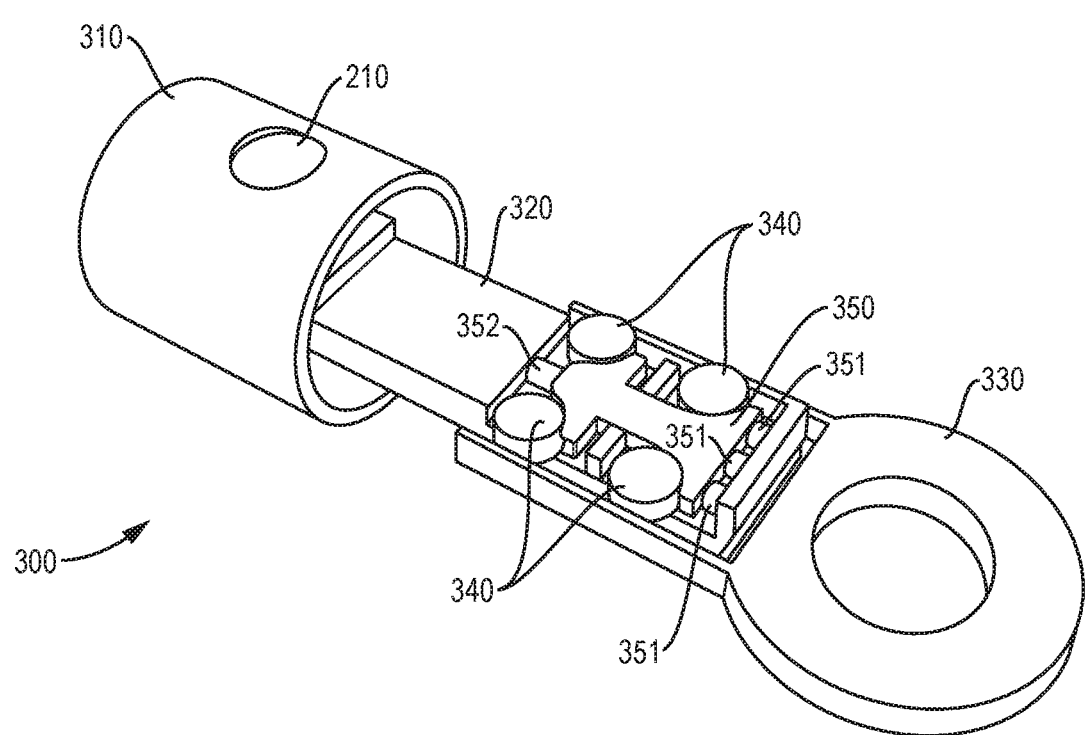
FIGS. 10A-10C are views of the magnetically-actuated piston and connecting rod device of FIGS. 9A and 9B when no current is applied to the solenoid wrapped around the cylinder of the engine.
Figure 10B:
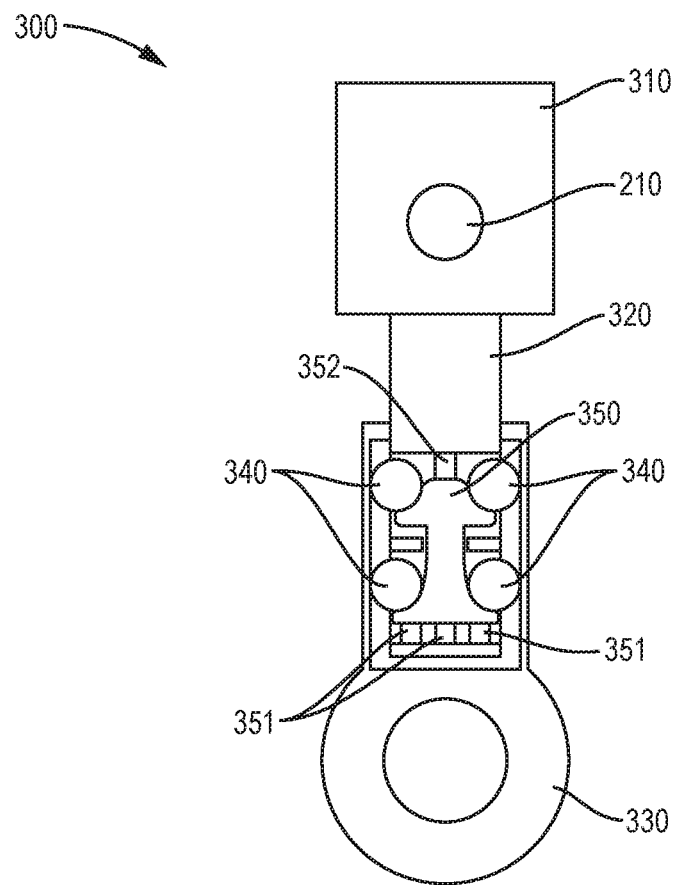
Figure 10C:
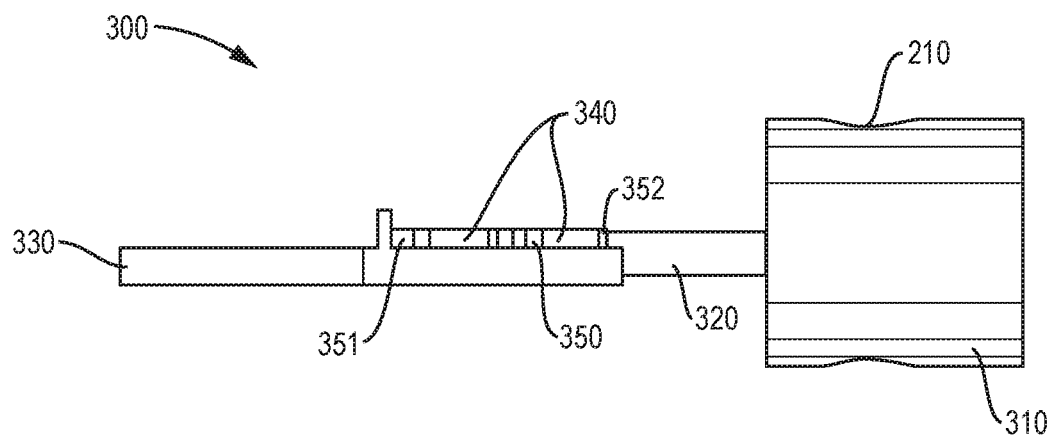

Referring first to FIGS. 10A-10C, which include a cross-sectional perspective view, a cross-sectional top view, and a cross-sectional side view, respectively, of the magnetically-actuated piston and connecting rod device 300, no current is applied to the solenoid 410 which is wrapped around cylinder 400. Thus, in the example of 10A-10C, the magnetic field proximate to the cylinder 400 may be inactive, resulting in the locked state of the connecting rod device and the retracted state of the piston coupling mechanism 200.

Here, the connecting rod magnet 350 can be held in a default or centered position by virtue of first and second springs 351 and 352. While the connecting rod magnet 350 is centered, the rollers 340 can be prevented from rotating due to the connecting rod magnet 350 abutting or pressing against the outer circumferential surfaces of the rollers 340. As a result, the male component 320 can be locked in place inside of the female component 330 such that the male and female components 320 and 330 are held in unison. In this position, the female component 330 is prevented from sliding along the rollers 340, as the rollers 340 are unable to rotate.

Additionally, in the absence of the magnetic field proximate to the cylinder 400, the first and second piston-cylinder coupling pads 210 can be retracted, or withdrawn, in the piston head 310. That is, the first and second piston-cylinder coupling pads 210 can be positioned inside of an outer wall of the piston head 310. In this position, the piston head 310 is able to move freely within the cylinder 400 due to regular operation of the engine.

Figure 11A:
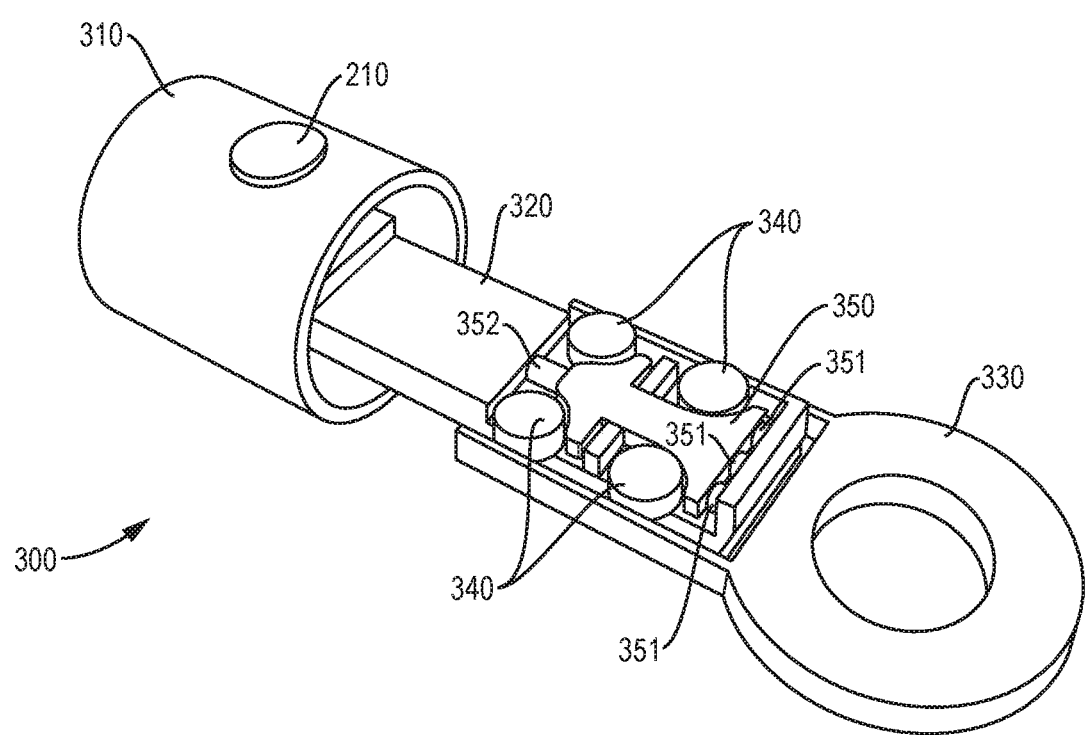
FIGS. 11A-11C are views of the magnetically-actuated piston and connecting rod device of FIGS. 9A and 9B when a current passes through the solenoid wrapped around the cylinder of the engine.
Figure 11B:
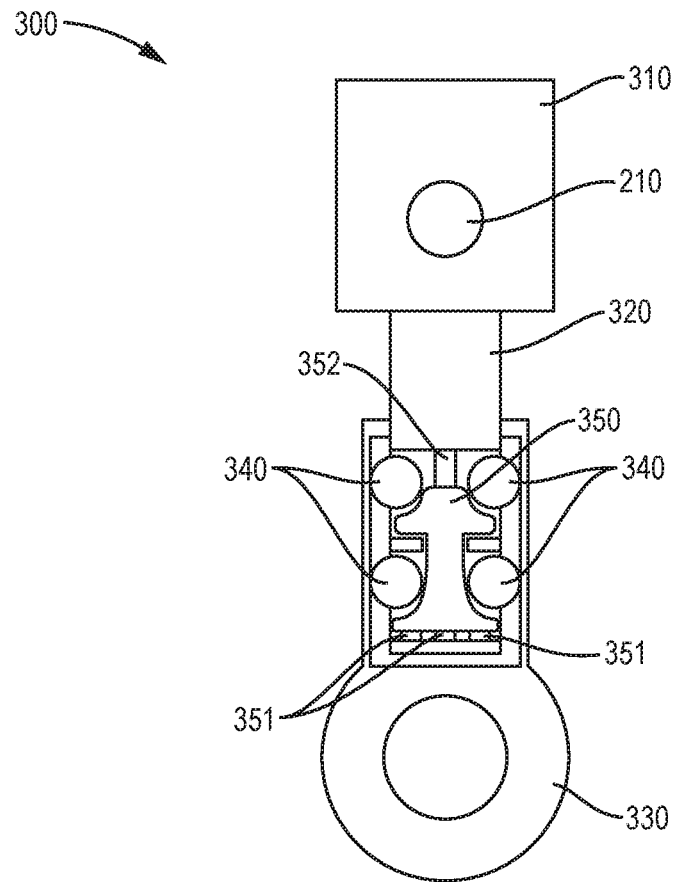
Figure 11C:
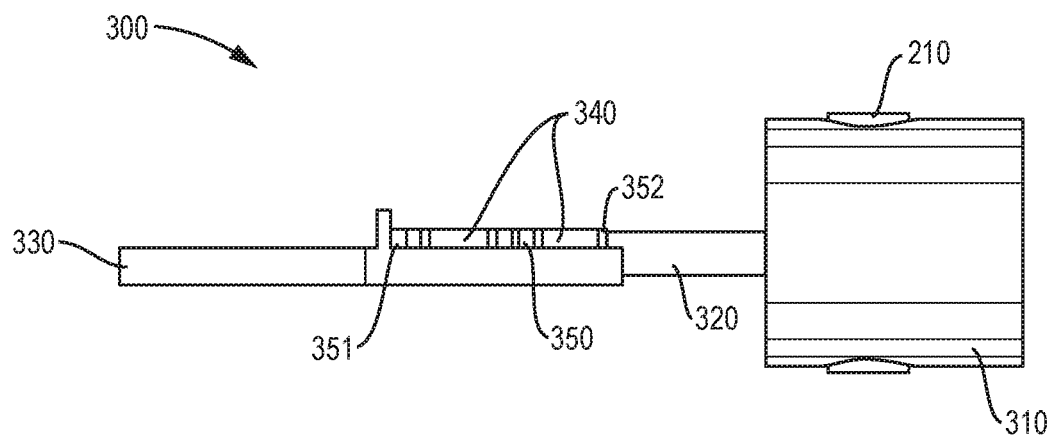

Next, referring to FIGS. 11A-11C, which include a cross-sectional perspective view, a cross-sectional top view, and a cross-sectional side view, of the magnetically-actuated piston and connecting rod device 300, a current passes through the solenoid 410 wrapped around the cylinder 400, thereby generating a magnetic field along the length of the cylinder 400. Thus, in the example of FIGS. 11A-11C, the magnetic field proximate to the cylinder 400 may be active, resulting in the unlocked state of the connecting rod device and the extended state of the piston coupling mechanism 200.

Here, the connecting rod magnet 350 can move down the length of the male component 320, that is, proximally (toward the female component 330) along the axis of the connecting rod, in response to the generated magnetic field, thereby compressing the first spring 351 proximal of the connecting rod magnet 350. The proximal movement of the connecting rod magnet 350 can separate the magnet 350 from the rollers 340, allowing them to rotate. This, in turn, can allow for the inner surface of the female component 330 to slide along the rotating rollers 340 such that the female component 330 moves freely over the male component 320. By "unlocking" the female component 330, it is allowed to move independent of the male component 320 along the axis of the connecting rod due to the inertia of the normal crankshaft motion (rotation), thereby adjusting the effective length of the connecting rod. The springs 351 and 352 can return the connecting rod magnet 1350 to its centered, "default" position once the current applied to the solenoid 410 stops.

Additionally, in response to the generated magnetic field, the piston coupling mechanism 200 can be activated, causing the piston coupling mechanism magnet 220 to move along the guiding rod 230 in a direction perpendicular to the piston coupling mechanism 200 (toward the fixed base member 240). Such movement of the piston coupling mechanism magnet 220 can cause the first and second piston-cylinder coupling pads 210 to move along the axis of the piston coupling mechanism 200, so as to extend beyond the outer wall of the piston head 310, into the inner wall of the engine cylinder 400. This can hold the piston head 310, and the male component 320 attached thereto, in place inside of the cylinder 400.

The unlocking of the female component 330 from the male component 320, along with the coupling of the piston head 310 to the inner wall of the cylinder 400, can enable the female component 330 to freely move over the male component 320 while current passes through the solenoid 410. Like the magnetically-actuated piston and connecting rod device 100, this can allow for dynamic adjustment of connecting rod length based on the point in time during the combustion cycle at which the current activates, as described in greater detail with reference to FIGS. 12-16.

Figure 12:
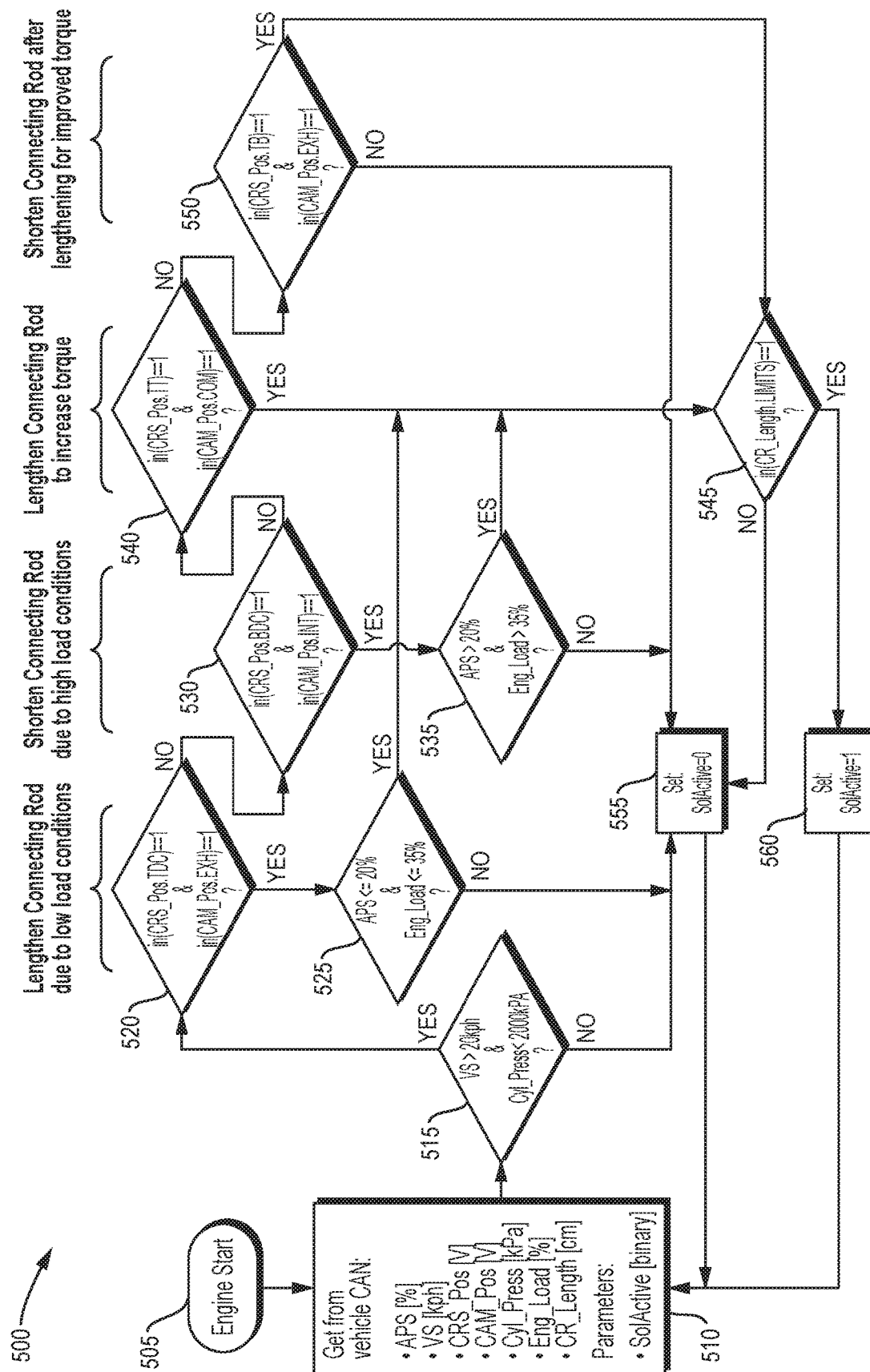
FIG. 12 is a flowchart illustrating an exemplary procedure for controlling operation of a magnetically-actuated piston and connecting rod device.
Figure 13:
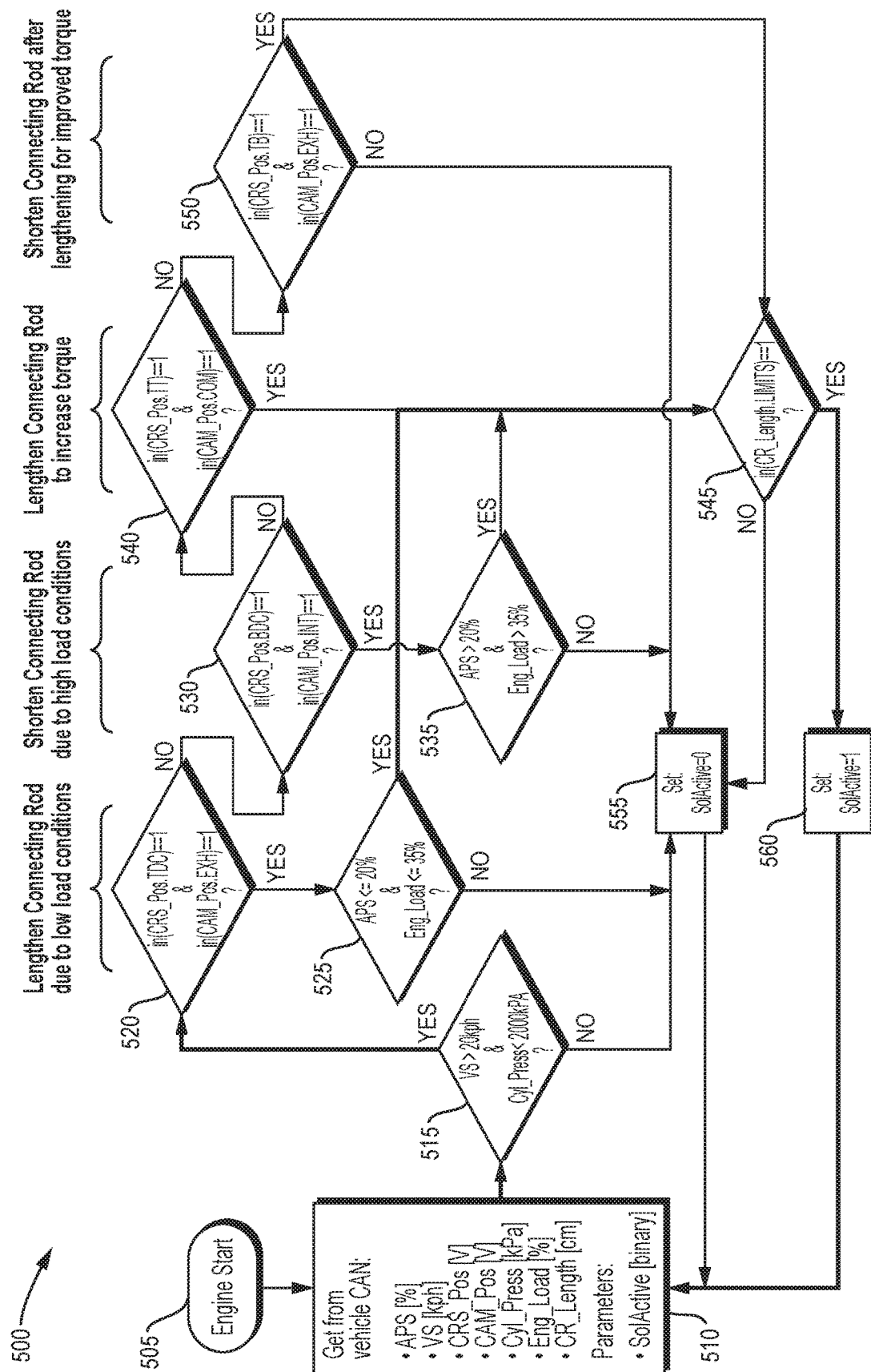
FIG. 13 is the flowchart of FIG. 12 showing an exemplary procedure for lengthening the connecting rod of the magnetically-actuated piston and connecting rod device.
Figure 14:
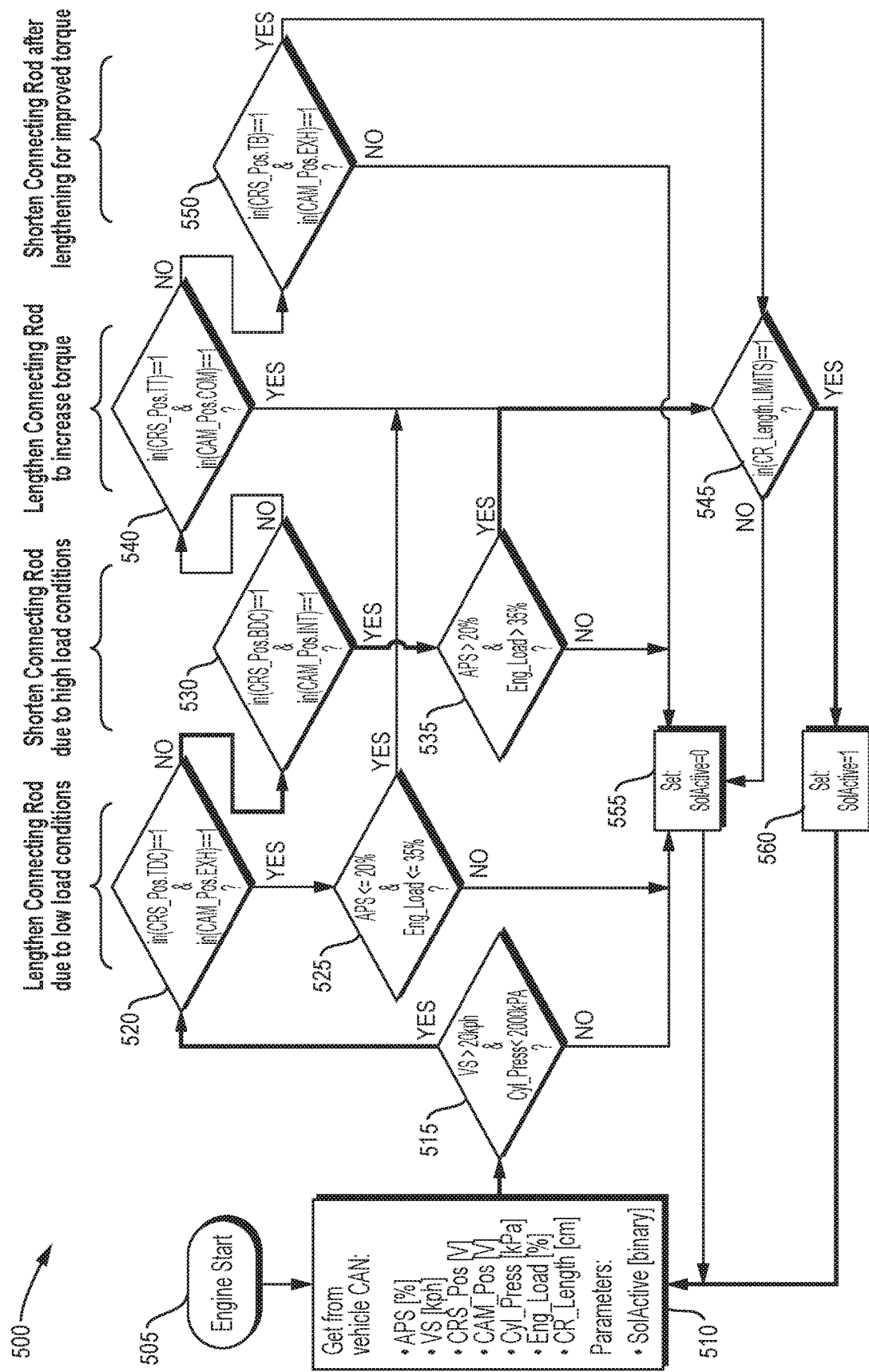
FIG. 14 is the flowchart of FIG. 12 showing an exemplary procedure for shortening the connecting rod of the magnetically-actuated piston and connecting rod device.
Figure 15:
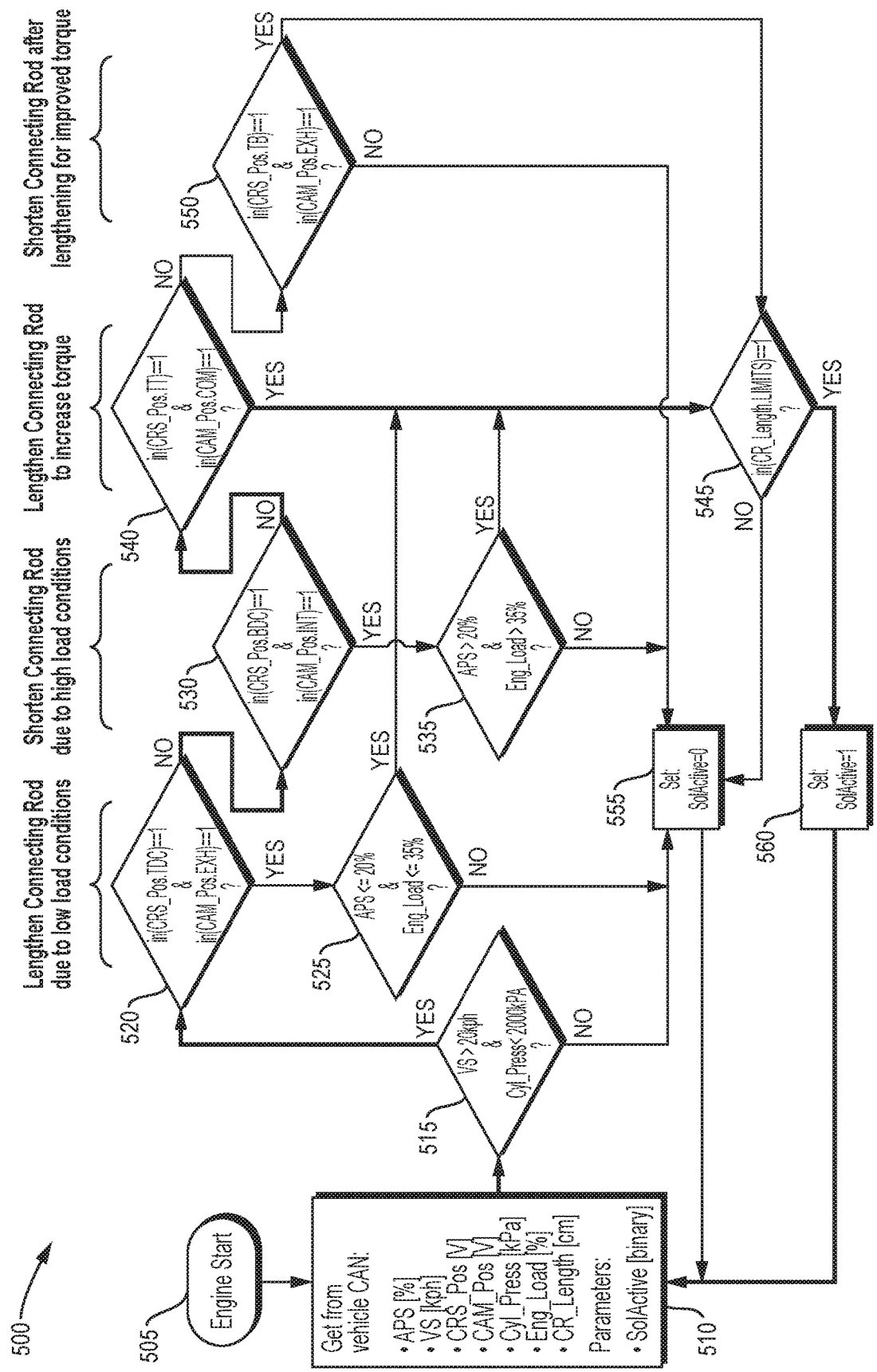
FIG. 15 is the flowchart of FIG. 12 showing an exemplary procedure for lengthening the connecting rod of the magnetically-actuated piston and connecting rod device to achieve a torque increase.

Next, FIGS. 12-16 demonstrate methods for controlling operation of a magnetically-actuated piston and connecting rod device described herein (e.g., magnetically-actuated piston and connecting rod device 100, magnetically-actuated piston and connecting rod device 300, etc.). Particularly, FIG. 12 is a flowchart 500 illustrating an exemplary procedure for controlling operation of a magnetically-actuated piston and connecting rod device; FIG. 13 includes the flowchart 500 showing an exemplary procedure for lengthening the connecting rod of the magnetically-actuated piston and connecting rod device; FIG. 14 includes the flowchart 500 showing an exemplary procedure for shortening the connecting rod of the magnetically-actuated piston and connecting rod device; FIG. 15 includes the flowchart 500 showing an exemplary procedure for lengthening the connecting rod of the magnetically-actuated piston and connecting rod device to achieve a torque increase; and FIG. 16 includes the flowchart 500 showing an exemplary procedure for shortening the connecting rod of the magnetically-actuated piston and connecting rod device after lengthening the connecting rod for improved torque.

As shown in FIGS. 12-16, the procedure 500 may start at step 505, and continue to step 510, where, as described in greater detail below, operation of the herein-disclosed magnetically-actuated piston and connecting rod device can be controlled so as to lengthen or shorten the variable-length connecting rod in response to specific load conditions. For the purpose of FIGS. 12-16, it assumed that the magnetically-actuated piston and connecting rod device is equipped in an engine of a vehicle. However, the magnetically-actuated piston and connecting rod device described herein is not limited solely to vehicles, but can be equipped in any engine-powered machine.

At step 505, an engine (not shown) can be started, whereby the engine includes one or more cylinders 400 around which the solenoid 410 is wrapped. It is to be understood that the control logic illustrated throughout FIGS. 12-16 can be implemented individually for each magnetically-actuated piston and connecting rod device disposed in each cylinder 400 of the engine.

At step 510, a plurality of vehicle measurements can be acquired. Such vehicle measurements can represent the basis upon which the current load conditions are determined. In some embodiments, a vehicle controller area network (CAN) controller in communication, via an in-vehicle network, with a plurality of sensors disposed throughout the vehicle can acquire the vehicle measurements from individual sensors. For example, such vehicle measurements can include, but are not limited to, an accelerator or throttle position via an accelerator position sensor (APS), a vehicle speed (VS) via a vehicle speed sensor, a crankshaft position (CRS_Pos) and a camshaft position (CAM_Pos), a cylinder pressure (Cyl_Press) via a pressure sensor, an engine load percentage (Eng_Load) via an engine load sensor, an effective length of the variable-length connecting rod (CR_Length) via a proximity sensor, or any combination thereof. It is to be understood that the sensors for detecting these vehicle measurements are not limited solely to those listed above.

Additionally, one or more parameters for controlling the variable-length connecting rod can be managed throughout the procedure 500. For example, activation of the solenoid 410 wrapped around the cylinder 400 can be tracked and controlled using 'SolActive'. SolActive can be a binary parameter set to either 0 or 1. For example, when no current is applied to the solenoid 410, such that the magnetic field proximate to the cylinder 400 is deactivated, and magnetic bodies in the magnetically-actuated piston and connecting rod device are in a default or centered position, SolActive can be set to 0. Conversely, when a current passes through the solenoid 410, such that the magnetic field proximate to the cylinder 400 is active, causing movement of the magnetic bodies in the magnetically-actuated piston and connecting rod device, as described above, SolActive can be set to 1.

At step 515, the vehicle speed and cylinder pressure can be compared with predetermined thresholds to determine whether initial conditions are satisfactory to adjust the variable-length connecting rod. For example, the vehicle speed can be compared with a predefined minimum speed, e.g., 20 kph, and the cylinder pressure can be compared with a predefined maximum pressure, e.g., 2000 kPA.

If the vehicle speed is less than or equal to the predefined minimum speed or the cylinder pressure is greater than or equal to the predefined maximum pressure, the procedure 500 can proceed to step 555, whereby the connecting rod device can operate without adjustment, that is, without lengthening or shortening the connecting rod. Here, the SolActive parameter can be set to 0 to preclude current from passing through the solenoid 410. The magnetic field proximate to the cylinder 400 can be deactivated as a result. This can cause the connecting rod device to operate in a manner similar to a conventional fixed-length connecting rod.

Conversely, if the vehicle speed is greater than the predefined minimum speed and the cylinder pressure is less than the predefined maximum pressure, the procedure 500 can proceed to step 520 and beyond, where it can be determined whether one or more conditions are satisfied upon which the length of the connecting rod can be adjusted by supplying current to pass through the solenoid 410. Particularly, the load conditions of the engine can be verified to adjust the connecting rod length in accordance with the current load, thus improving the compression ratio and overall driving efficiency. To this end, when low or high load conditions are experienced, the variable-length connecting rod can be lengthened or shortened by activating the current passing through the solenoid 410 at a specific point in time, that is, at a predefined position of the piston in the cylinder 400, e.g., top dead center (TDC), bottom dead center (BDC), etc., and a predefined combustion stroke of the piston, e.g., exhaust (EXH), intake (INT), compression (COM), etc. Particularly, the engine compression ratio can be varied to best suit engine load conditions by passing a current through the solenoid 410 during the intake or exhaust stroke, as described below.

At step 520, the respective positions of the crankshaft and the camshaft can be detected in order to confirm the current position of the piston in the cylinder 400 (i.e., "first condition") and the current combustion stroke of the piston (i.e., "second condition"). If the position of the crankshaft indicates that the piston is located at top dead center in the cylinder 400 (in(CRS_Pos.TDC)==1), i.e., "first position," and the position of the camshaft indicates that the combustion stroke of the engine is the exhaust stroke (in(CAM_Pos.EXH)==1), i.e., "first stroke," the timing can be satisfactory for activating the current passing through the solenoid 410 when low load engine conditions are satisfied (step 525). If either of the above conditions are not satisfied, however, the respective positions of the crankshaft and the camshaft can be re-evaluated at step 530 to confirm the current position of the piston in the cylinder 400 and the current combustion stroke of the piston. If the position of the crankshaft indicates that the piston is located at bottom dead center in the cylinder 400 (in(CRS_Pos.BDC)==1), i.e., "second position," and the position of the camshaft indicates that the combustion stroke of the engine is the intake stroke (in(CAM_Pos.INT)==1), i.e., "second stroke," the timing can be satisfactory for activating the current passing through the solenoid 410 when high load engine conditions are satisfied in (step 535). In some embodiments, a proximity sensor can be used to assess how far the piston head 110 is from the top of the cylinder 400 to confirm the piston is at top dead center or the bottom of the cylinder 400 to confirm the piston is at bottom dead center within approximately +/−5 degrees.

Low or high load engine conditions can be verified in a variety of ways, including comparing the current engine load with a predefined engine load threshold and comparing the current accelerator position with a predefined accelerator position. For example, an accelerator position threshold value and engine load threshold value, below which the engine load is low and above which the engine load is high, can be predefined. Using this approach in step 525, if the current accelerator position is less than or equal to a predefined accelerator position threshold value, e.g., 20%, and the current engine load is less than or equal to a predefined engine load threshold value, e.g., 35%, it can be determined that low load conditions are present. Conversely, in step 535, if the current accelerator position is greater than the predefined accelerator position threshold value, e.g., 20%, and the current engine load is greater than the predefined engine load threshold value, e.g., 35%, it can be determined that high load conditions are present.

If the piston is located at top dead center, the combustion stroke of the engine is the exhaust stroke, and low engine load conditions are confirmed, the procedure 500 can proceed to step 545 where it can be determined whether the current effective length of the connecting rod is at its maximum. If the effective length of the connecting rod is not already maximized, the connecting rod can be lengthened by applying an electric current to the solenoid 410 wrapped around the cylinder 400 (SolActive=1) such that the current passes through the solenoid 410 to generate a magnetic field that activates magnetic bodies of the magnetically-actuated piston and connecting rod device in the manner described above (step 560). By generating the magnetic field while the piston is located at top dead center during the exhaust stroke, the connecting rod can be continuously lengthened as the male component 120 is pulled further out of the female component 130, thereby increasing the effective length of the connecting rod during low load conditions to improve driving performance, as demonstrated in FIG. 13.

On the other hand, if the piston is located at bottom dead center, the combustion stroke of the engine is the intake stroke, and high engine load conditions are confirmed, the procedure 500 can proceed to step 545 where it can be determined whether the current effective length of the connecting rod is at its minimum. If the effective length of the connecting rod is not already minimized, the connecting rod can be shortened by applying an electric current to the solenoid 410 wrapped around the cylinder 400 (SolActive=1) such that the current passes through the solenoid 410 to generate a magnetic field that activates magnetic bodies of the magnetically-actuated piston and connecting rod device in the manner described above (step 560). By generating the magnetic field while the piston is located at bottom dead center during the intake stroke, the connecting rod can be continuously shortened as the male component 120 is pushed further into the female component 130, thereby decreasing the effective length of the connecting rod during high load conditions to improve driving performance, as demonstrated in FIG. 14.

Meanwhile, if the current is passed through the solenoid 410 while the piston is located at top dead center during the compression stroke, and the spark timing is delayed until the connecting rod is lengthened (due to activating the solenoid current while the piston is at top dead center), an increased torque on the crankshaft can be produced during the power stroke due to the crankshaft being rotated further away from the top dead center position when initial power delivery occurs. In detail, FIG. 15 illustrates a procedure for lengthening the variable-length connecting rod to improve engine torque. At step 540, it can be determined whether the crankshaft is positioned such that the piston is located at top dead center through approximately 30 degrees clockwise (in(CRS_Pos.TT)==1), and the position of the camshaft indicates that the combustion stroke of the engine is the compression stroke (in(CAM_Pos.COM)==1). If both of the above conditions are satisfied, the procedure 500 can proceed to step 545 where it can be determined whether the current effective length of the connecting rod is at its maximum. If the effective length of the connecting rod is not already maximized, the connecting rod can be lengthened by supplying the current to the solenoid 410 (SolActive=1) such that the current passes through the solenoid 410 to generate a magnetic field that activates magnetic bodies of the magnetically-actuated piston and connecting rod device in the manner described above (step 560). Moreover, the spark can be delayed until the current passing through the solenoid 410 is deactivated to produce a higher torque delivery from a larger moment arm in the connecting rod device.

Figure 16:
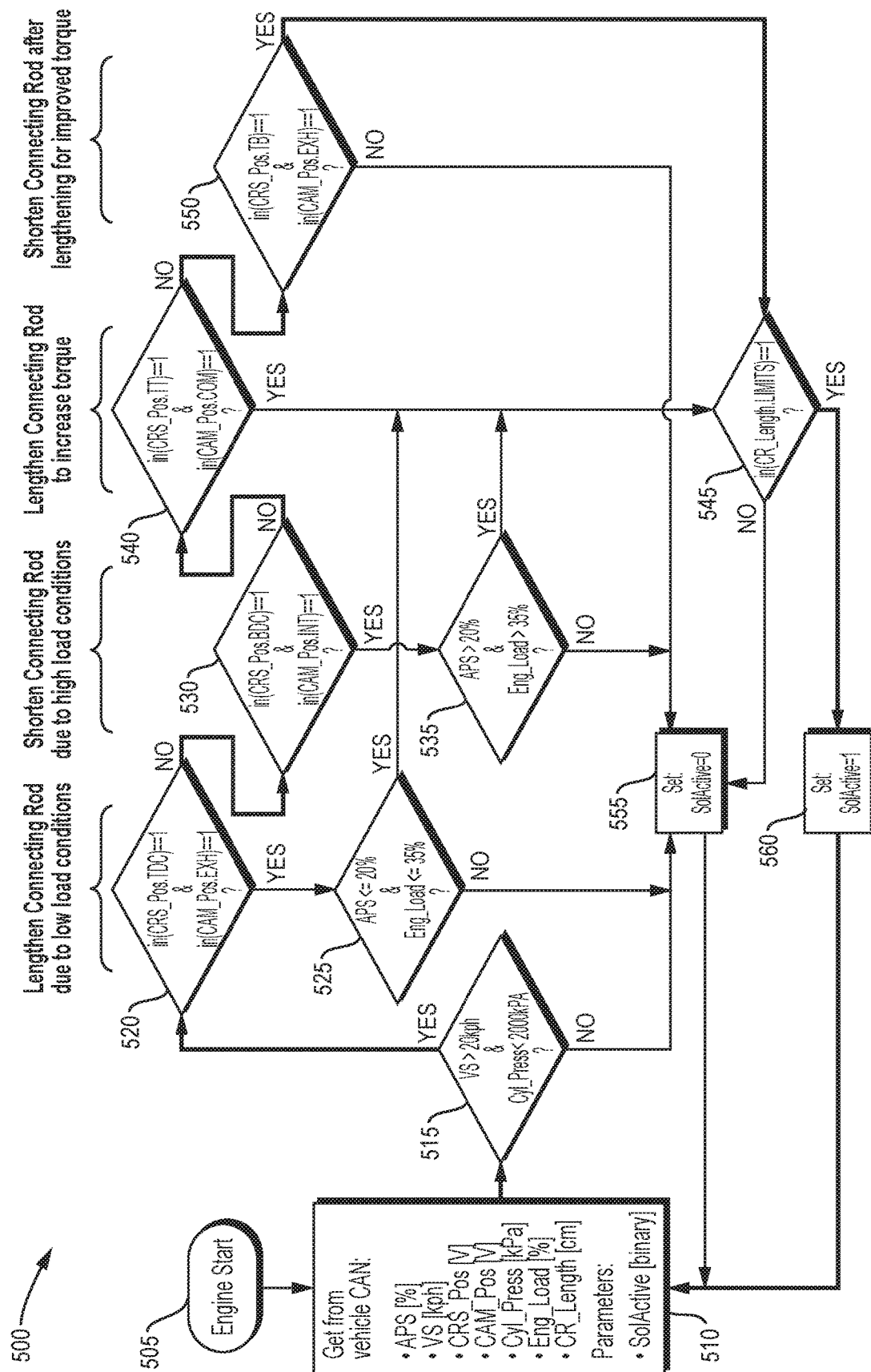
FIG. 16 is the flowchart of FIG. 12 showing an exemplary procedure for shortening the connecting rod of the magnetically-actuated piston and connecting rod device after lengthening the connecting rod for improved torque.

FIG. 16 illustrates a shortening for lengthening the variable-length connecting rod to improve engine torque. At step 550, it can be determined whether the crankshaft is positioned such that the piston is located at bottom dead center through approximately 30 degrees clockwise (in(CRS_Pos.TB)==1), and the position of the camshaft indicates that the combustion stroke of the engine is the exhaust stroke (in(CAM_Pos.EXH)==1). If both of the above conditions are satisfied, the procedure 500 can proceed to step 545 where it can be determined whether the current effective length of the connecting rod is at its minimum. If the effective length of the connecting rod is not already minimized, the connecting rod can be shortened to return the connecting rod to its original length (before the compression stroke) by re-supplying the current to the solenoid 410 (SolActive=1) such that the current passes through the solenoid 410 to generate a magnetic field that activates magnetic bodies of the magnetically-actuated piston and connecting rod device in the manner described above (step 560). Therefore, the connecting rod length can continually increase near top dead center of the compression stroke, then decrease near bottom dead center of the following exhaust stroke. The adjustment of connecting rod length during these times can enable better torque delivery to the crankshaft.

The procedure 500 can continue throughout operation of the engine and end upon deactivation of the engine. The techniques by which the steps of procedure 500 may be performed, as well as ancillary procedures and parameters, are described in detail above.

It should be noted that the steps shown in FIGS. 12-16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, the magnetically-actuated variable-length connecting rod devices and methods for controlling the same discussed herein can yield powertrain performance and efficiency improvements by adjusting engine displacement to dynamically suit engine load. Under low-load conditions, such as idling, the connecting rod can lengthen, raising the compression ratio and improving efficiency, which results in fuel savings. Under high-load conditions, the connecting rod can shorten, lowering the compression ratio and improving driving performance, such as by allowing increased boost from a turbocharger with a reduced likelihood of engine knock. Because the variable-length connecting rod device discussed herein is magnetically-actuated, the device can have minimal packaging compromises compared to conventional variable displacement engine approaches. For aside from a solenoid wrapped around each engine cylinder, all other components can be contained within the existing engine cylinder space. Moreover, the magnetically-actuated variable-length connecting rod device discussed herein can improve energy efficiency over conventional variable displacement engine approaches, since only a brief pulse of electric current is sufficient for actuating the magnetic components that unlock the connecting rod components, as described above, and the connecting rod extends or contracts using only inertia from the crankshaft.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus comprising:
   a piston head configured to be disposed inside of a cylinder of an engine;
   a connecting rod device coupled to the piston head and extending therefrom, the connecting rod device including:
      a variable-length connecting rod including a female component with a hollow body and a male component movably disposed at least partially inside of the female component, the male component configured to be coupled to a crankshaft of the engine, and
      a connecting rod magnet movably coupled to the female component; and
   a piston coupling mechanism disposed at least partially inside of the piston head to couple the connecting rod device to the piston head,
   wherein the connecting rod device is configured to transition between a coupled state, in which the male component is held in unison with the female component, and a de-coupled state, in which the connecting rod magnet moves in response to a magnetic field proximate to the cylinder causing a release of the male component, allowing the male component to move independent of the female component along an axis of the connecting rod, and
   wherein the connecting rod device further includes first and second male-female coupling pads disposed on opposite sides of the female component, the first and second male-female coupling pads configured to move perpendicular to the axis of the connecting rod.

2. The apparatus of claim 1, wherein, when the connecting rod device is in the coupled state, the first and second male-female coupling pads abut an outer surface of the male component to hold the male component in unison with the female component, and when the connecting rod device is in the de-coupled state, the first and second male-female coupling pads release the male component, allowing the male component to move along the axis of the connecting rod.

3. The apparatus of claim 1, wherein the first and second male-female coupling pads are configured to hold the male component in unison with the female component by applying opposing forces on the male component perpendicular to the axis of the connecting rod.

4. The apparatus of claim 1, wherein the connecting rod magnet is connected to the first and second male-female coupling pads such that movement of the connecting rod magnet causes movement of the first and second male-female coupling pads.

5. The apparatus of claim 4, wherein movement of the connecting rod magnet along the axis of the connecting rod causes movement of the first and second male-female coupling pads perpendicular to the axis of the connecting rod.

6. The apparatus of claim 1, wherein the connecting rod device further includes:
   first and second joints extending through the first and second male-female coupling pads, respectively;
   a third joint extending through the connecting rod magnet; and
   first and second linkage arms, the first linkage arm adjoining the first joint to the third joint, and the second linkage arm adjoining the second joint to the third joint.

7. The apparatus of claim 1, wherein the connecting rod magnet is configured to move along the axis of the connecting rod in response to the magnetic field.

8. The apparatus of claim 1, wherein the connecting rod magnet is configured to move in a first direction in response to the magnetic field and in a second, opposite direction in response to deactivation of the magnetic field.

9. The apparatus of claim 1, wherein, when the connecting rod device is in the de-coupled state, the male component is configured to move independent of the female component due to rotation of the crankshaft.

10. The apparatus of claim 1, wherein the female component is positionally fixed with respect to the connecting rod device.

11. The apparatus of claim 1, wherein the magnetic field is generated when a current passes through a solenoid wrapped around the cylinder.

12. An apparatus comprising:
    a piston head configured to be disposed inside of a cylinder of an engine;
    a connecting rod device coupled to the piston head and extending therefrom, the connecting rod device including:
       a variable-length connecting rod including a female component with a hollow body and a male component movably disposed at least partially inside of the female component, the male component configured to be coupled to a crankshaft of the engine, and
       a connecting rod magnet movably coupled to the female component; and
    a piston coupling mechanism disposed at least partially inside of the piston head to couple the connecting rod device to the piston head,
    wherein the connecting rod device is configured to transition between a coupled state, in which the male component is held in unison with the female component, and a de-coupled state, in which the connecting rod magnet moves in response to a magnetic field proximate to the cylinder causing a release of the male component, allowing the male component to move independent of the female component along an axis of the connecting rod, and wherein the connecting rod device further includes first and second springs disposed on opposite axial ends of the connecting rod magnet.

13. The apparatus of claim 12, wherein, when the connecting rod device is in the coupled state, the first and second springs maintain the connecting rod magnet in a centered position, and when the connecting rod device is in the de-coupled state, the first spring compresses due to movement of the connecting rod magnet along the axis of the connecting rod.

* * * * *